United States Patent [19]

Morris et al.

[11] 4,259,590
[45] Mar. 31, 1981

[54] AREA MEASURING MACHINE

[75] Inventors: Roy Morris; Terence J. Pickering, both of Scarborough, England

[73] Assignee: USM Corporation, Farmington, Conn.

[21] Appl. No.: 10,133

[22] Filed: Feb. 7, 1979

[30] Foreign Application Priority Data

Feb. 9, 1978 [GB] United Kingdom ................ 5180/78

[51] Int. Cl.³ .............................................. G01N 21/86
[52] U.S. Cl. .................................... 250/560; 356/380
[58] Field of Search ............... 250/560, 559, 571, 572, 250/578, 209; 356/379, 380, 381, 383, 384; 364/560, 564

[56] References Cited

U.S. PATENT DOCUMENTS

| 3,819,918 | 6/1974 | Hale ..................................... 364/564 |
| 3,983,403 | 9/1976 | Dahlstrom et al. .................. 356/380 |
| 4,060,734 | 11/1977 | Tilley et al. ........................... 250/560 |

*Primary Examiner*—David C. Nelms
*Attorney, Agent, or Firm*—Donald N. Halgren; Vincent A. White

[57] ABSTRACT

Electronic wheel-type area measuring machine has manual or automatic operating means, arranged to emit, at a predetermined point in the machine cycle, a test start signal, the operating means includes test means, which upon receipt of the test start signal, feeds signals to computing means of the machine until the computing means registers a predetermined number whereupon a stop signal is emitted. The test means has duplicate computing means which also receives the test signals until the stop signal is emitted, whereupon the number of signals received by the duplicate computing means is compared with the predetermined number and an alarm signal is given if the number recorded by the duplicate computer means differs by more than a predetermined tolerance from the predetermined number. The counter check system also preferably provides a visual test on a visual test display unit and an output printer.

10 Claims, 12 Drawing Figures

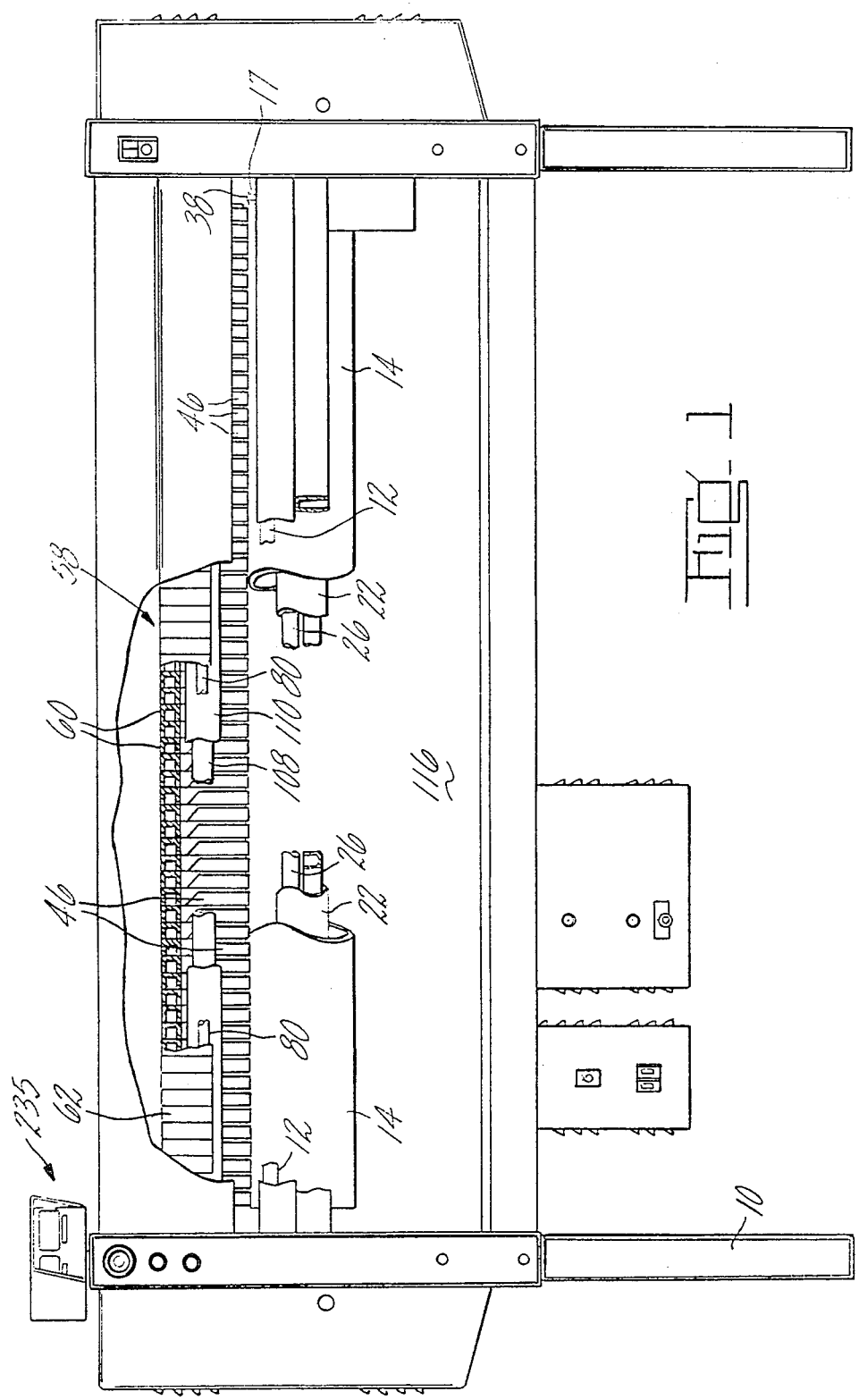

FIG_2

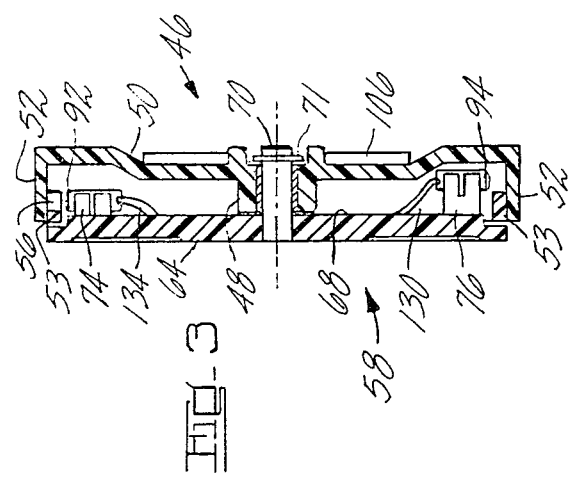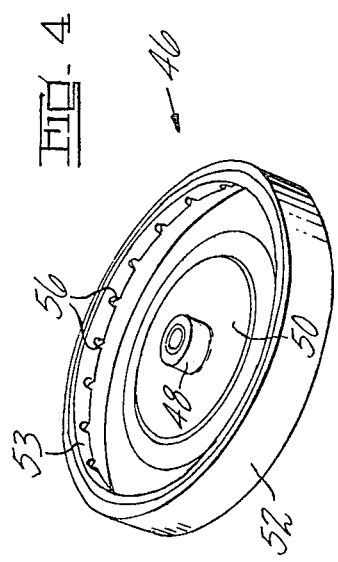

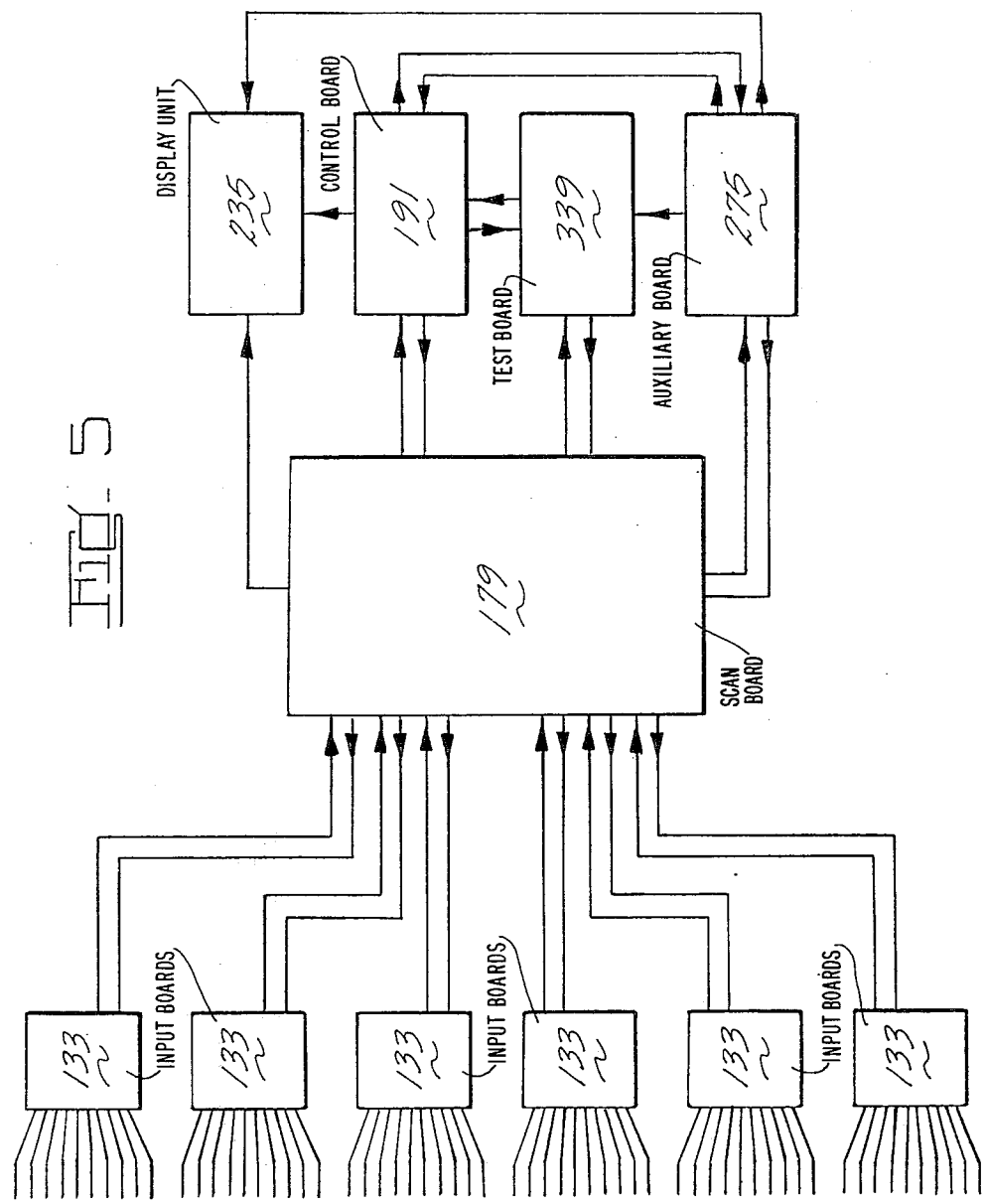

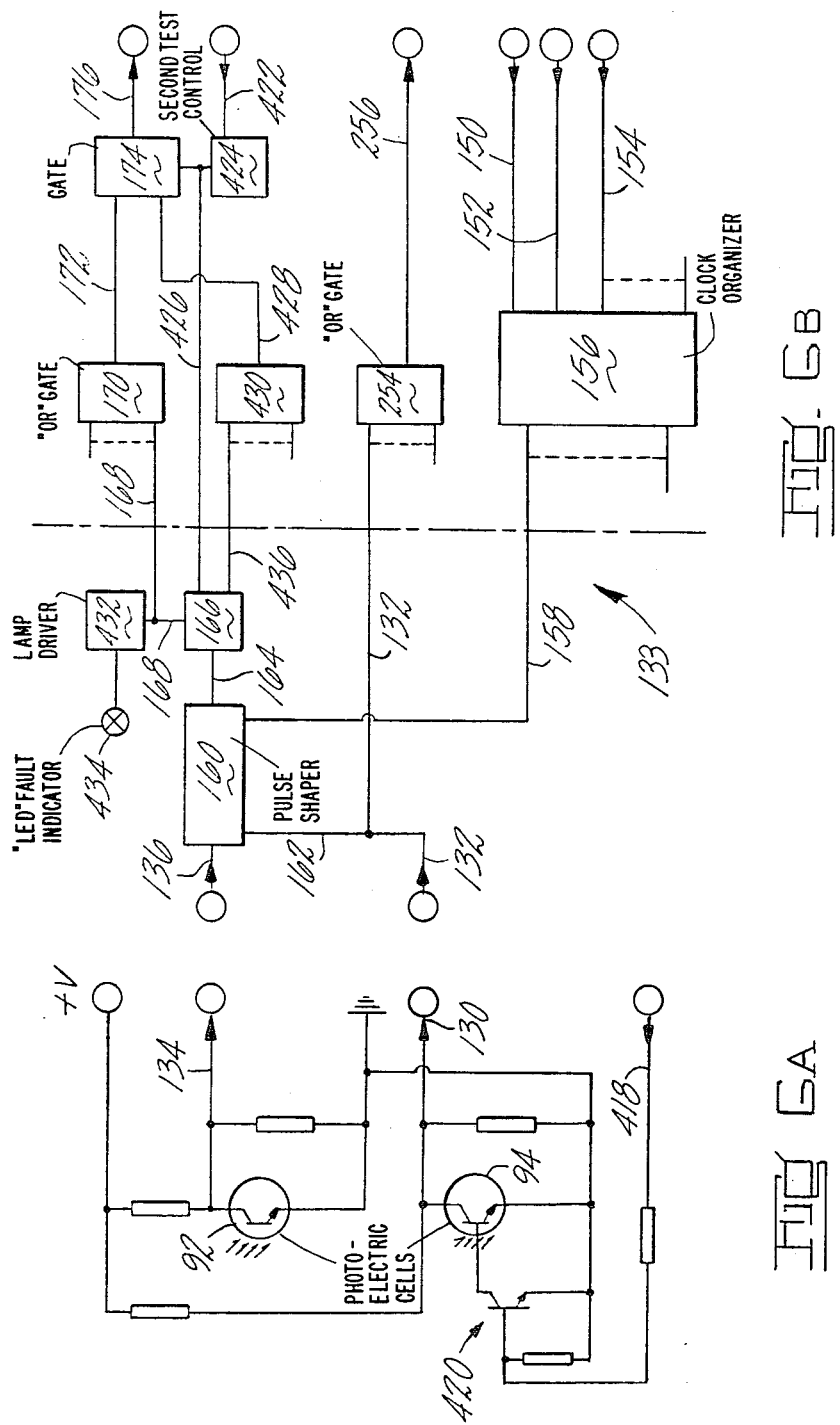

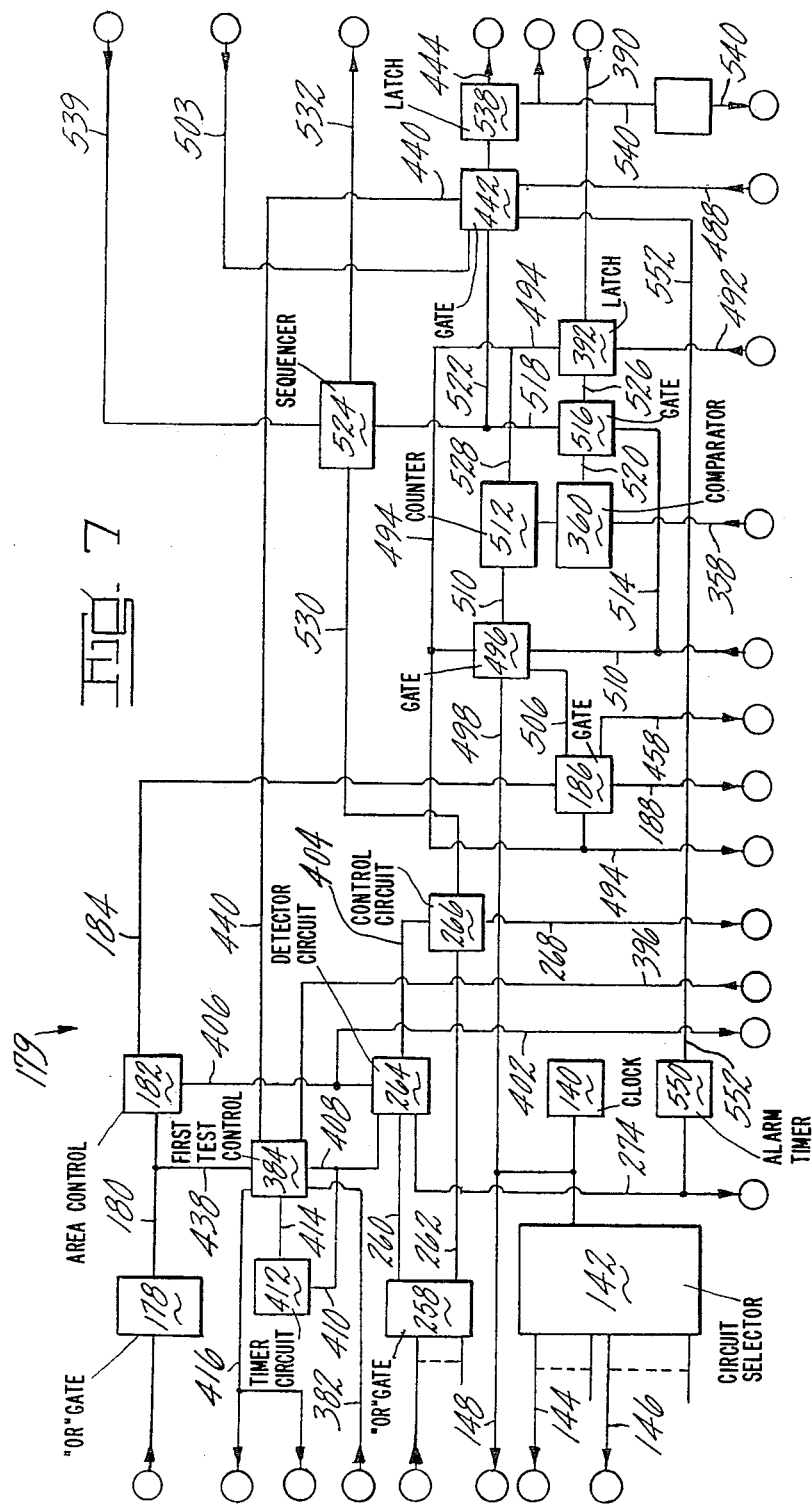

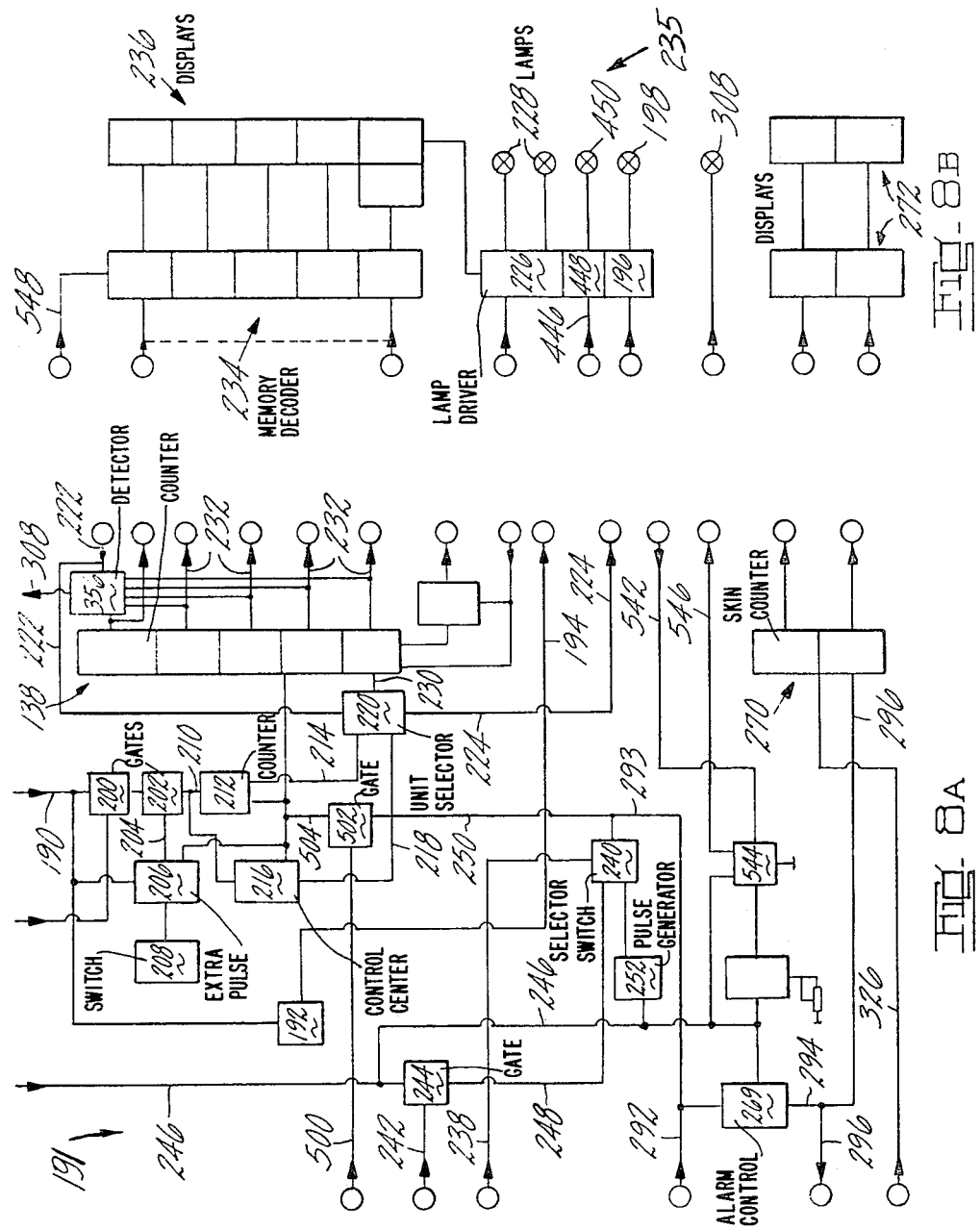

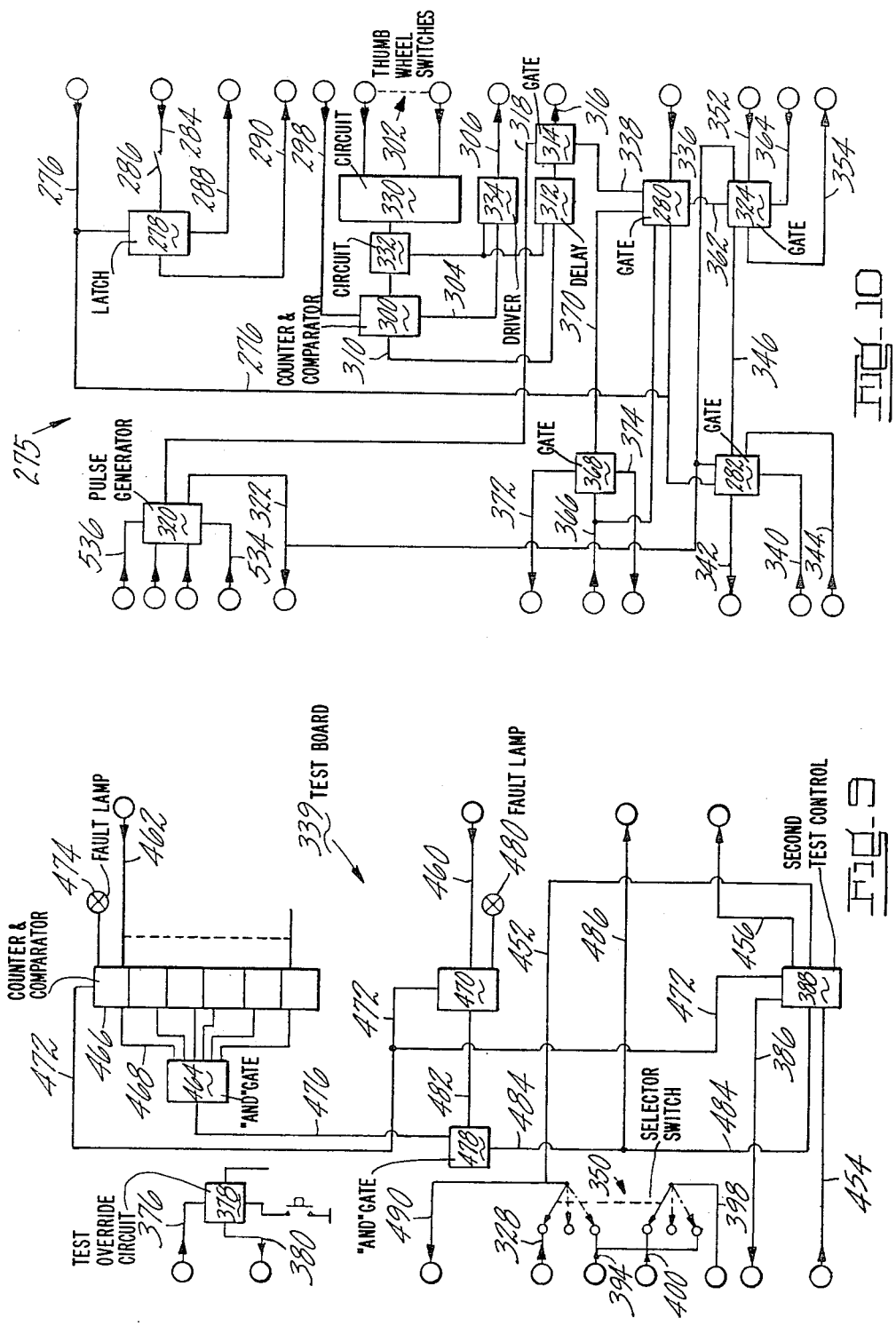

4,259,590

AREA MEASURING MACHINE

BACKGROUND OF THE INVENTION

1. Field of the Invention

This invention is concerned with improvements in or relating to area measuring machines.

2. Prior Art

In the complete specification of U.S. Pat. No. 3,717,414, issued Feb. 20, 1973, U.K. Pat. No. 1,446,866, are described area measuring machines comprising (a) support means, e.g., a roller, for supporting sheet material the area of which is to be measured and for feeding the material through the machine, (b) a plurality of wheels disposed side by side across the machine and arranged to run on the roller or on the sheet material fed by the roller past the wheels, (c) detecting means, one associated with each wheel, for detecting the presence of a piece of sheet material fed between the wheel and the roller, (d) signalling means for signalling each time the periphery of a wheel has been rotated through a unit distance by the passage of sheet material therepast and (e) computing means for summing the signals from each wheel to indicate the area of the piece of sheet material.

Such machines have been found to be, in operation, reliable and accurate. However, should a fault develop on a machine such as described in the aforementioned patent specifications, it is difficult to notice. In order to test that such machines are operating satisfactorily it is a known practice to feed a piece of leather of known area through the machine a number of times, and check that the area of the piece registered by the machine is within the permitted tolerances.

One of the various objects of the present invention is to provide an improved area measuring machine in which it is possible readily to check that the machine is operating satisfactorily.

BRIEF SUMMARY OF THE INVENTION

The invention provides in one of its various aspects an area measuring machine comprising (a) conveyor means comprising a conveyor surface for supporting sheet material the area of which is to be measured and for conveying the sheet material through the machine in the operation thereof, (b) a plurality of wheels disposed side by side across the machine and arranged to run on sheet material conveyed by the conveyor means or, in the absence of sheet material, on the conveyor surface, (c) detecting means, one associated with each wheel for detecting the presence of a piece of sheet material between the wheel and the conveyor surface, (d) signalling means for signalling each time the periphery of a wheel has been rotated through a unit distance and for emitting a signal to be summed should the output from the detecting means associated with that wheel indicate that a piece of sheet material is present between the wheel and the conveyor surface, (e) computing means for summing the signals from each wheel to indicate the area of the piece of sheet material, (f) means arranged to emit a test start signal, and (g) test means so constructed and arranged that upon receipt of the test signal, test signals are fed to the computing means of the machine until the computing means registers a predetermined number upon registering wherein a stop signal is emitted. The test means comprises a duplicate summing means to which the test signals are also fed until the stop signal is emitted, the test means further comprising a comparator by which the number of signals recorded by the duplicate summing means is compared with the predetermined number, the test means being so constructed and arranged as to indicate a fault should the number registered by the duplicate summing means differ by more than a predetermined tolerance from the predetermined number.

Preferably the conveyor means comprises a roller, the surface of which provides the conveyor surface of the conveyor means.

Preferably each detecting means of the invention comprises a first detector equally spaced from next-adjacent first detectors and arranged at one side of the path of travel of the sheet material through the machine, to detect a beam of radiation directed theretowards from a first radiation source arranged at the other side of the path of sheet material so that the presence of sheet material between the wheel and the conveyor surface breaks the beam. Each first detector is a photoelectric cell and each first radiation source is a source of light. Suitably a single radiation source is arranged to direct a beam of radiation at all of the first detectors. Preferably the first radiation source is rich in infra red radiation and, where a single first radiation source is used to direct a beam of radiation at all of the first detectors, the first radiation source is a light tube of the type known as an "architectural tube" which has a filament extending the length thereof.

Preferably where the first radiation source is a source of light and first detectors are photoelectric cells. The conveyor means comprises a roller which is transparent to the radiation, for example a glass roller; preferably the glass roller is provided by a glass tube and the source of light is mounted inside the glass tube to direct a beam of radiation at the first detectors.

Preferably each of the wheels comprises a rim portion projecting generally parallel with the axis of rotation of the wheel from the remainder of the wheel. Preferably, in this case, where the first detectors are first photoelectric cells each first detector is mounted on means by which the wheel is supported within the radius of the rim portion and the rim portion is continuous and transparent to the infra red radiation emitted by the first radiation source, the first photoelectric cells being operated by the infra red radiation. Preferably in this case the signalling means of the invention comprise second radiation detectors, one associated with each wheel, mounted on means for supporting the wheel within the radius of the rim portion at one side of the rim portion, and a second radiation source mounted at the opposite side of the rim portion to direct a beam of radiation towards the second detectors. In this case the wheel preferably comprises alternate first and second portions, for example provided by a notched insert ring fitted in the rim portion, arranged so that as the wheel rotates the notched insert ring also rotates and intersects the beam of radiation from the second source. The material of the insert ring is opaque to the radiation emitted by the second radiation source (which is also preferably a source of light rich in infra red radiation, suitably an architectural tube) so that when one of the notches in the notched ring intersects the beam, radiation from the second source reaches the second detector but when the ring itself intersects the beam, radiation from the second source is prevented from reaching the second detector. The notches are so spaced apart that as the wheel rotates the distance moved by the running surface of the rim portion of the wheel from the point at which one of the notches intersects the beam of radiation from the second source permitting it to reach the second detector associated with the wheel (i.e. the notch is aligned between the second source of radiation and the second detector) to the point at which the next adjacent notch in the notched ring intersects the second beam of radiation and again permits the second beam to reach the second detector, is the unit distance. Thus the notched ring effectively divides the running surface of the rim portion into alternate first and second portions, the centers of the first portions of the running surface being equally spaced apart so that when one of the first portions of the running surface intersects the beam radiation from the second source reaches the second detector, but when one of the second portions of the running surface intersects the beam, radiation from the second source is prevented from reaching the second detector. Rotation of the wheel thus causes a pulse representing unit area to be generated by the signalling means each time the rim portion of the wheel has rotated through the unit distance, the pulse being emitted by the signalling means to be summed by the computing means for summing the signals when the first detector associated with that wheel indicates the presence of sheet material between the wheel and the conveying means.

The means to emit a test start signal may conveniently comprise a push button operable by an operator of the machine, or may be automatic. Where the means arranged to emit a test start signal is automatic it may be arranged so that when a predetermined number of pieces of sheet material have passed, in the operation of the machine, between the conveyor surface and the wheels, the test start signal is emitted; the predetermined number may be one (that is the test start signal is emitted after each piece of sheet material has passed through the machine) or it may be any other number which may be preset in the machine or which may be set by the operator prior to commencing operation of the machine.

The test means may comprise an indicator in the form of a lamp which will be illuminated should a fault occur. The invention comprises a visual display which displays the area of a piece of sheet material which has been measured. The test means is constructed and arranged so that the predetermined number is easily remembered, for example, 2222.2 and this number is displayed on the visual display unit at the completion of the test, provided that the equipment is not faulty. Should a different number be shown on the visual display unit at the end of the test this constitutes a further indication that the machine is faulty and provides a visual check that the display system is functioning correctly. Should the test lamp indicate no fault but the display unit not show the predetermined number this constitutes an indication that there is a fault in the display unit.

A machine in accordance with the invention preferably also comprises a printer on which the area of each piece of sheet material is printed after it has been measured. The test means may also, suitably, be arranged to cause the printer to print out the predetermined number on completion of the test satisfactorily. If the printer fails to print out the predetermined number while the test light indicates that there is no fault in the counting circuit of the machine, this provides an indication that there is a fault in the printer unit.

The invention also comprises means giving a warning should a piece of sheet material be moved, in the operation of the machine, in the direction opposite the through-feed direction (such movement would lead to an erroneous area measurement) similar to that described in the aforementioned U.K. Patent Specification No. 1,446,866.

Reference is hereby directed to the copending U.S. patent application Ser Nos. 010,134 and 010,135 both filed Feb. 7, 1979, for discussion of other testing facilities which are preferably included in a machine in accordance with the invention.

BRIEF DESCRIPTION OF THE DRAWINGS

The above and other of the various objects and several aspects of the present invention will become more clear from the following description, to be read with reference to the accompanying drawings, of an area measuring machine. It will be realized that this area measuring machine has been selected for description to illustrate the invention by way of example and not by way of limitation of the invention.

In the accompanying drawings:

FIG. 1 is a front view, with parts broken away, of the illustrative machine;

FIG. 2 is a side view, partly in section of part of the illustrative machine showing a wheel and a roller thereof;

FIG. 3 is a view in section on the lines III—III of FIG. 2, of a wheel and support member of the illustrative machine;

FIG. 4 is a perspective view of a wheel of the illustrative machine;

FIG. 5 is a diagrammatic view showing electrical circuitry and printed circuit boards of the illustrative machine indicating electrical connections in a general manner;

FIG. 6a is a view showing electrical circuitry mounted on each support member of the illustrative machine;

FIG. 6b is a diagrammatic view showing electrical circuitry of an input board of the illustrative machine;

FIG. 7 is a diagrammatic view showing electrical circuitry of a scan board of the illustrative machine;

FIG. 8a is a diagrammatic view showing electrical circuitry of a control board of the illustrative machine;

FIG. 8b is a diagrammatic view showing a display unit of the illustrative machine;

FIG. 9 is a diagrammatic view showing electrical circuitry of a test board of the illustrative machine; and FIG. 10 is a diagrammatic view showing electrical circuitry of an auxiliary board of the illustrative machine.

DESCRIPTION OF THE PREFERRED EMBODIMENT

The illustrative area measuring machine is generally similar in construction and design to the machines described by way of example in the aforementioned U.S. Pat. No. 3,717,414 issued Feb. 20, 1973 and U.K. Pat. No. 1,446,866 and reference is hereby directed to the aforementioned patent specifications for further information on aspects of the illustrative machine not described herein in detail.

The illustrative area measuring machine comprises a frame 10 on which is mounted a horizontal feed table 12 extending the width of the machine. A glass roller 14 is mounted for rotation about a horizontal axis rearwardly of the feed table, with an upper portion of the roller positioned so as to receive sheet material, for example, hides H, the areas of which are to be measured, fed rearwardly on the feed table 12 by an operator. A plurality of identical wheels 46 are disposed side by side across the machine and are mounted for rotation about horizontal axes parallel with the axis of the glass roller 14. The wheels 46 rest on the glass roller 14 when no material is being fed through the machine.

The glass roller 14 is driven to rotate it about its axis in the operation of the machine by an electric motor (not shown) through a drive belt 38 passing around a pulley 17 at an end portion of the glass roller. The speed of the motor is adjustable so as to adjust the throughput speed of sheet material between 18 meters a minute and 25 meters a minute.

The wheels are carried by an arrangement of support members 58. Each of the support members 58 is identical, and for convenience, only one will be described hereinafter. The support member 58 is injection molded of plastics material and comprises an arm portion 60 and at one end of the arm portion, a cowl portion 62, as shown in FIG. 2. The cowl portion 62 comprises an end plate 64 which is disposed vertically when the support member is mounted in the machine and, projecting from this end plate, a wall 66 having a cylindrical inner surface. A metal axle pin 70 projects at right angles from an inner surface 68 of the end plate 64, as shown in FIG. 3, and lies axially of the cylindrical inner surface of the wall 66. The axle pin 70 is incorporated in the plastics portion of the support member 58 during the molding thereof. The axle pin 70 and wall 66 project from the end face 64 of the cowl portion in the same direction. The height of the wall 66 above the inner surface 68 of the end plate 64 is the same along the whole of the wall and the same as the length of the axle pin 70 above the inner surface 68. Thus an outer end portion of the axle pin 70 and a rim portion of the wall 66 remote from the end plate 64 lie in a plane. Clip members 74 and 76, as shown in FIG. 2, project inwardly from the inner surface 68 of the end plate 64, a first, lower, clip member 76 being disposed on a lower portion of the wall and the second clip member 74 being disposed at a position where a line from the clip member 74 to the axle pin 70 makes a right angle with a line from the clip member 76 to the axle pin 70 the clip members 74 and 76, are spaced from the inner surface of the wall 66, the lower clip member 76 projecting further than the other clip member 74, as shown in FIG. 3.

A plurality of rods 80 are supported coaxially by a number of brackets 82 projecting rearwardly from a front portion of the frame 10. The arm portions 60 are generally U-shaped, as shown in FIG. 2, and comprise a boss 86 at the end portion of the arm portion 60 remote from the cowl portion 62, the boss 86 being received on one of the rods 80 so that the support members 58 can pivot about the rods 80. Each of the rods 80 is of such length as to accommodate a group of ten support members 58 (with the bosses 86 in contact). Each of the rods 80 can readily be lifted clear of its support brackets 82 so that for maintenance purposes groups of ten support members can readily be removed from the machine. The support members 58 are supported by the rods 80 so as to project rearwardly from the rods 80. A gap 88, as shown in FIG. 2, is formed in a lower portion of the wall 66 and the gap 88 extends round to just beyond the clip member 74.

Each of the wheels 46 is, as hereinbefore mentioned, identical and only one wheel will therefore be described. Each wheel is injection molded of a plastics material which is opaque to visible light but transparent to infra red radiation. Each wheel 46 comprises a central boss 48, as shown in FIG. 2, connected by a web portion 50 (to which a metal disc 106 is secured, to weigh the wheel/support member assembly) to a rim portion 52 having a cylindrical, outer, running surface, the rim portion being continuous and having no holes therein. Each wheel further comprises a notch ring 53 slidingly received within the rim portion 52 and secured thereto, as shown in FIGS. 2-4, the notch ring extending across approximately half the axial width of the rim portion 52. The notch ring 53 is injection molded of a plastics material which is opaque both to visible light and infra red radiation. Notches 58 are equally spaced round the notch ring. A radial line drawn from the axis of rotation of the wheel 46 on the axle pin 70 through the center of a notch 56 intersects the running surface of the rim portion at a position spaced a unit distance (in the case of the illustrative machine 20 mm) from the position at which a radial line drawn from the axis of rotation through the center of the next adjacent notch 56 intersects the running surface of the rim portion. Thus the running surface of the wheel 46 can be considered to be divided by the notches 56 into 20 mm circumferential lengths. Each of the wheels 46 is mounted for rotation on one of the axle pins 70 projecting from the end plate 64 of one of the support members 58, the axle pin being received in a hole in the boss 48 of the wheel 46. The wheels 46 are each retained on the pins 70 by a circlip 71. The cowl portion 62 of each support member 58 is such that the wall 66 thereof shrouds the rim portion 52 of its associated wheel except at a lower end portion where the rim portion 52 projects through the gap 88 in the wall. The first and second clip members 76, 74 are thus enclosed in a space bounded by the rim portion 52, the web portion 50 of the wheel and the end plate 64 and wall 66 of the cowl portion 62 of the support member. A lower, first photoelectric cell 94 is mounted in the clip member 76 with its light receiving portion directed downwardly towards the gap 88 in the wall 66. The rim portion 52 of the wheel lies radially outwardly of the lower photoelectric cell 94 and the light receiving portion is directed towards the rim portion of the wheel clear of the notch ring 53 and towards a lower light source e.g., a light tube 26. A second photoelectric cell 92 is held by the clip member 74 with a light receiving portion directed towards the gap 88 radially outwardly in a direction at right angles to that of the first cell 94. The cell 92 is aligned with the notch ring 53 and the notches 56 in the notch ring 53 are so positioned as to move on a path (when the wheel 46 is rotated) which intersects a line drawn between the light receiving portion of the second photoelectric cell 92 and an upper light source, e.g., a light tube 108. The photoelectric cells 92 and 94, are connected by wires 130 and 134, as shown in FIG. 2, to an input board 133, as shown in FIGS. 5 and 6. The photoelectric cells 92 and 94, are of a type sensitive to infra red radiation as well as visible light and respond rapidly to light.

The mounting of the photoelectric cells 92 and 94, between the web portion 52 of the wheel and the end plate 64 of the cowl portion 62 gives protection to the cells 92 and 94, against contamination by dust. The cowl portion 62 (which is opaque both to visible light and infra red radiation) also minimizes the risk of stray radiation reaching the cells 92 and 94, and activating them to cause false area indicating pulses to be recorded by a computing device of the illustrative machine. The mounting of the photoelectric cells 92 and 94, (and associated light sources 108 and 26) at right angles to one another minimizes the risk of light from the upper light source 108 activating the cell 94 or light from the lower light source 28 activating the cell 92 or of reflected light activating the cells. The construction and arrangement of the machine is such that when the support members 58 are mounted on an associated rod 80, the axle pin 70 are horizontal and parallel with the axis of rotation of the glass roller 14, the axle pins 70 also lying on the axis of the cylindrical running surface of the rim portions 52 of the wheels 46.

The glass roller 14, as hereinbefore mentioned, is supported for rotation in bearings (not shown). A steel tube 22 mounted on the frame 10 passes through the bearings and lies with its axis on the axis of rotation of the glass roller 14. The steel tube 22 has a slot 25 extending along its length between the end supports and facing upwardly. The light tube 26 is mounted in the steel tube 22 in such a manner as to illuminate the whole of the slot 25. The slot 25 is so positioned that light emitted by the light tube 26 passing through the slot 25 is directed towards the first photoelectric cells 94. The light tube 25 is of the type known as an "architectural tube" and has a filament extending the length thereof. The light emitted by the tube 26 is relatively rich in infra red radiation which readily penetrates the plastic of the rim portion 52 of the wheels 46 to reach the first photoelectric cells 94.

The support members 48 when mounted on the rods 80 as hereinbefore described cause the first photoelectric cells 94 to be evenly spaced apart across the illustrative machine, the spacing preferably being 25 mm.

Every other one of the wheels 46 and support members 58 has a striker arm 102 associated therewith as shown in FIG. 2. Each arm 102 has a lightly spring-loaded end portion (not shown) as a push-fit over the boss 48 of the associated one of the wheels with the striker arm between the web portion 50 of the wheel and the end plate 64 of the associated one of the support members 58. The degree of friction between the inner end of the striker arm 102 and the boss 48 of the wheel 46 may be adjusted by a screw (not shown) and is such that when the wheel rotates in the through feed direction little braking force is applied to the wheel; the arm is prevented from rotating as the wheel rotates by engagement with the clip member 76. However, should the wheel be rotated in the direction opposite the through feed direction the arm 102 will be rotated towards a microswitch 78 secured to the inner surface 68 of the end plate 64 of each of the support members 58 and thereby operate the microswitch 78 to cause an alarm signal to be transmitted to the electrical circuitry.

The plastics material of which the wheels are formed is such that there is little or no frictional drag between the bosses 48 and support members 58. The wheels are weighted to ensure that they rest (when material is not passing through the machine) with the running surface in contact with the glass roller 14. When the wheels 46 are in contact with the glass roller, the axle pins 70 are, as hereinbefore mentioned, coaxial.

The light tube 108 is mounted in the machine between the rods 80 and the cowl portions 62 of the support members 58. The light tube 108 is an architectural tube of similar type to the tube 26. The light tube 108 is mounted in a metal tube 110 in which a slot 114 is cut in a side portion extending across the illustrative machine parallel with the rods 80, as shown in FIG. 2. The slot 114 is disposed in alignment with the photoelectric cells 92 on the support members 58 so that when one of the notches 56 in the notch ring 53 of one of the wheels 46 is in alignment with the light receiving portion of the photoelectric cell 92 associated with that wheel, light from the light tube 108 shines through the slot 114 and the notch 56 onto the light receiving portion of the photoelectric cell.

A metal chute 116, as shown in FIG. 1, is mounted on a rear portion of the frame 10 so that material fed between the wheels 46 and glass roller 14 from the front in the operation of the machine is deflected downwardly and then forwardly by the chute 116 so that the material leaves the machine through an opening in the lower front portion of the machine beneath the feed table 12.

The machine also comprises scraper means (not shown) so arranged that skins fed through the machine still adhering to the glass roller 14 when they reach the scraper means are scraped by the scraper means from the surface of the roller 14 and fall into the chute 116.

A felt pad (not shown) may be provided extending the length of the glass roller 14 (clear of the light tube 26) bearing on the roller 14 to wipe the glass roller as it rotates to remove dirt from the roller so that passage of light through the roller 14 is not impeded and the risk of dirt being transferred to the leather is reduced.

The electrical circuitry of the present invention is hereinafter described diagrammatically with reference to FIGS. 5–10 of the accompanying drawings. In FIG. 6a is shown electrical circuitry which is mounted on each support member 58 but for convenience the circuitry associated with only one of the support members is shown in FIG. 6a. The first photoelectric cell 94 (of detecting means of the machine) has an output line 130 connected to an input line 132 of an input board 133, as shown in FIG. 6b of the illustrative machine. The second photoelectric cell 92 (of signalling means) is connected by an output line 134 to a second input line 136 to the input board.

There are sixty support members 58 and associated wheels 46 in the machine and each input board 133 has associated with it ten of the support members 58 and wheels. On the input board some of the circuitry is duplicated for each of the support members 58; for convenience only one set of this circuitry is shown in FIG. 6b, to the left of the chain-dot line.

In the operation of the machine a piece of leather H passing through the machine between one of the wheels 46 and the glass roller 14 will prevent light from the lower light source 26 reaching the first photoelectric cell 94 associated with that wheel. This will cause a signal to be sent on the line 130 to the line 132 to indicate the presence of sheet material between that wheel and the roller 14. As the wheel rotates, with the running surface thereof running on the surface of the leather as it feeds between the wheel and the glass roller, the notches 56 intersect the beam of light from the light tube 108 and cause light from the tube 108 to fall on the second photoelectric cell 92 in a series of pulses, each of which indicates that the running surface of the wheel 46 has moved through the unit distance (20 mm in the case of the machine). The pulses thus generated are transmitted on the line 134 to the line 136.

As hereinbefore mentioned the machine comprises six input boards, each of which having ten input circuits similar to the circuit shown to the left of the chain-dot line in FIG. 6b. In order to count the pulses generated by all of the wheels, without losing a pulse, it is necessary to ensure that the pulses reach counters 138 shown in FIG. 3a of the machine in an ordered serial format. In order to achieve this, the machine comprises a clock 140 as shown in FIG. 7, by which a circuit selector 142 is driven. The circuit selector 142 has a number of output lines represented by the line 144 by which one of the six input boards is selected, and a plurality of output lines represented by the line 146 by which one of the input circuits (to the left of the chain-dot line viewing FIG. 6b is selected. A clock output line 148 also leads from the clock 140. The clock output line 148 is connected to a clock input line 150 of each input board. Each of the output lines 144 by which one of the input boards is selected is connected to a selector input line 152 of the appropriate input board; thus the output line 144 is connected to the selector input line 152 of the input board shown in FIG. 6b. Each of the output lines from the circuit selector 142 for selecting one of the input circuits of an input board is connected to one of the input lines of all six input boards; thus the output line 146 is connected to the first circuit input line 154 of the input board shown in FIG. 6b. The clock, selector, and circuit input lines 150,152 and 154, lead to a clock organizer 156 on the input board. In the operation of the machine the circuit selector 142 selects one of the input board selector output lines for example the line 142 and then runs through each of the circuit selector output lines in sequence and thus the clock organizer 156 causes a clock pulse to be fed in sequence to each of the input circuit clock lines (of which a clock line 158 is representative) of that input board. The circuit selector 142 selects each of the input board selector output lines in sequence and thus a clock pulse is fed on every input circuit clock line sequentially to every input circuit of each input board of the illustrative machine, synchronized by the clock 140.

As hereinbefore mentioned there are six input boards each having ten input circuits similar to that shown to the left of the chain-dot line in FIG. 6b; each of these input circuits operates in a similar manner and for simplicity the operation of only one of the input circuits will be hereinafter described. As the wheel 46 rotates causing pulses of light to fall on the photoelectric cell 92 electrical pulses are emitted on the output line 134, to the input line 136 which leads to a pulse shaper 160; the pulses emitted on the line 134 have a guassian shape which is caused as the notch passes across the beam of light detected at the photoelectric cell 92. The pulse shaper 160 shapes these pulses to a square wave form. When the first, lower, photoelectric cell 94 detects that a piece of leather is passing between the wheel and the glass roller 14 a signal is emitted on the output line 130 to the input line 132 and from the input line 132 on a read line 162 leading to the pulse shaper. At the same time the clock 140, circuit selector 142, and clock organizer 156 cause clock pulses to be sent on the input circuit clock lines in a regular sequence. When a signal indicating that leather is present in the machine, is present on the read line 162 and a pulse is received from the photoelectric cell 92 on the input line 136 to the pulse shaper, the pulse is shaped to a square wave form but is inhibited until the end of the pulse on the input line 136. When the end of the pulse on the input line 136 has been detected the next clock pulse received on the input circuit clock line 158 causes an output pulse to be emitted from the pulse shaper 160 on the line 164; the output pulse is of the same shape and duration as the clock pulse generated by the clock 140. The output pulse on the line 164 passes through a latch 166 and leaves the latch on a line 168 which is received by a ten-way "or" gate 170. There is one such ten-way "or" gate on each input board, arranged to receive pulses from each of the input circuits of that input board. When a pulse is received by the ten-way "or" gate, an output pulse is delivered on a line 172 to a gate 174 which gives an area output pulse on an output line 176 from the input board. Each input board has one such output line and each such output line is connected to a six-way "or" gate on a scan board 179 as shown in FIG. 5. Receipt of a pulse by the six-way "or" gate 178 causes an area output pulse to be emitted on an output line 180. Because each of the pulse shapers 160 is scanned sequentially under the organization of the clock 140, circuit selector 142, and clock organizer 156 pulses can only be received by the "or" gate 178 sequentially, these pulses having the length and shape of the clock pulse and each pulse being spaced from the next pulse by at least the interval between successive clock pulses (if no leather is between on of the wheels 46 and the roller 14, no pulses will be emitted in respect of the input circuit associated with that wheel and thus no pulse will be fed to the "or" gate 178). Area pulses on the output line 180, as shown in FIG 7, are fed through an area control 182 to a line 184 leading to a gate 186 and from the gate 186 on an output line 188 leading to an area input line 190 of a control board 191, (see FIG. 8a). The line 190 has a branch leading to a lamp driver 192, an output line 194 from which leads to a pulsing indicator control 196 as shown in FIG. 8b, by which an indicator lamp 198 on the display is caused to pulsate by the area pulses thus indicating that the area is being measured.

The area input line 190 of the control board also leads to a gate 200 through a second gate 202 by which extra pulses may be introduced on a line 204 from an extra pulse control 206. The extra pulse control 206 receives the area pulses from the line 190 and a switch 208 is associated with the extra pulse control, as shown in FIG. 8a. The switch is adjustable by an operator in one percent steps to cause the extra pulse control 206 to make a percentage increase in the number of pulses leaving the gate 202 on an output line 210 over the number of area pulses being fed to the control board on the area input line 190. If this possibility of area input is not required, the gate 202, the extra pulse control 206 and the switch 208 may be omitted. Where the extra pulse control 206 is fitted, the switch 208 is operated, according to the type of leather which is being measured, to compensate for reduced area measurements arising because of folds or wrinkles in the skin which are impossible to eliminate as the skin is passed through the machine (but which will be eliminated during subsequent processing of the leather), the percentage increase being selected according to the average area not measured because of these wrinkles and folds.

The pulses received on the output line 210 are fed to a counter 212 which counts the pulses and gives an ouput on a line 214 representing area of leather in units of a quarter of a square foot, and to a counter 216 which counts the pulses and gives an output on a line 218 indicating area in square decimeters.

It will be appreciated that each pulse on the area input line 190 represents rotation of one of the wheels 46 by the unit distance of 20 mm. As each wheel 46 is spaced from the next adjacent wheels by a distance such that the first, lower, photoelectric cells 94 associated with each of the wheels is spaced by 22 mm from the cells of the next-adjacent wheels a pulse from one wheel represents an area of 500 square mm. Thus each pulse received on the area input line 190 indicates an area of 500 square mm. The output pulses on the line 210 represents this area plus any percentage increase in area fed in by the extra pulse control 206.

The lines 214 and 218, from the counters 212 and 216 lead to a unit selector 220. The unit selector 220 is set by the operator, before measurement of area commences, by operation of a selector switch (not shown) which causes a signal to be fed on a line 222 to the unit selector 220 indicating whether the output is required in quarters of a square foot or in square decimeters. An output is given from the unit selector on a line 224, as shown in FIG. 8a, which is connected to a lamp driver 226, as shown in FIG. 8b, on the display to illuminate an appropriate one of lamps 228 to indicate on the display, to the operator, the units in which the area is displayed. Depending on the setting of the unit selector 220 an output from the unit selector 220 is given on the line 230, this output being the signals delivered on the line 214 or on the line 218 as determined by the setting of the unit selector. The output from the line 230, in FIG. 8a, is fed to the counter 138 which gives binary counting decimal output on lines 232 which are fed to memory decoders 234 on a display unit 235, as shown in FIG. 8b, the memory decoders driving light emitting diode displays 236 to indicate the area measured. The smallest area displayed is one quarter of a square foot or 0.1 decimeters. The area outputs on the lines 232 are also fed to a memory of a printer which (when the end of a skin is detected) prints the area on a piece of paper and sorts an accumulated batch area total for a purpose to be discussed hereafter.

The machine of the present invention may be operated in one of two modes, either manual or automatic. The machine is normally operated in automatic and in this mode of operation the area of each skin is registered and remains displayed by the display unit until the next skin is put into the machine, the display remaining for a slight period, up to a maximum of one second, after the next skin has been put into the machine. When another skin is put into the machine the counter 138 is reset (as described hereinafter) so as to display the area of the next hide or skin after the delay previously mentioned. The machine is switched from manual to automatic by insertion of a switch plug into a socket of the machine which causes a signal to be sent on a line 238 to a selector switch 240, as shown in FIG. 8a. Conveniently a foot operated switch is used when the machine is in manual; the foot switch is so arranged that when its plug is inserted in the aforementioned socket a signal is supplied on the line 242 to a gate 244 which prevents a signal travelling on the line 246 reaching the line 248 and thus the signal is prevented from reaching the selector switch 240 so that no reset output is given on the line 250 from the selector switch to the counter 138, the counters 212 and 216 and the extra pulse control 206. When the machine is in the manual mode of operation depression of the foot switch by the operator causes a signal to pass onto the line 248 thereby allowing a pulse to be supplied from a pulse generator 252 through the selector switch 240 to the line 250 to reset the counter 138 and the counters 212 and 216, and the extra pulse control 206 to zero.

The machine further comprises means for detecting the presence of a skin or other piece of sheet material between one of the wheels 46 and the roller 14 in the operation thereof. The means for detecting the end of the machine utilizes the signal from the first, lower, photoelectric cell 94 on the input line 132 of the input board (as hereinbefore mentioned each input circuit, of which there is one for each lower photoelectric cell 94, has an input line but for simplicity of description only the input line 132 will be discussed hereinafter). The signals on the input lines of the input circuits on one of the input boards are fed to a ten-way "or" gate 254. Should a signal on any one of the input lines to the gate 254, shown in FIG. 6b, from the lower photoelectric cell 94, shown in FIG. 6a, indicate that there is a piece of sheet material between one of the wheels and the roller, an output signal is given from the gate on a skin detector output line 256 of the input board. The skin detector output line of each of the input boards is connected to a six-way "or" gate 258 on the scan board, as shown in FIG. 7. Should any signal indicating the presence of a skin between one of the wheels and the glass roller be received on any one of the input lines to the gate 258 a skin present signal is given on the output lines 260,262 from the gate. The output line 260 leads to an "end of skin" detector circuit 264 and the output line 262 leads to a control circuit 266. When a skin is in the machine and a signal indicating this is given on the line 262, the control circuit 266 causes a signal to be given on a line 268. The signal on the line 268 is received on the line 246 of the control board, (see FIG. 7). When a signal indicating that a skin has been fed into the illustrative machine is received on the line 246, shown in FIG. 8a, the signal passes through an alarm control 269 to a skin counter 270 which records the feeding through of the skin and causes the number of skins fed through the machine in the particular batch being measured to be displayed in a display 272, shown in FIG. 8b, on the display unit.

When a skin is first fed into the machine, an output indicating the presence of the skin is given on the line 260 which passes through the end of skin detector circuit 264, shown in FIG. 7. An output signal indicating that there is a skin in the machine is given on the line 274 from the circuit 264. The signal from the line 274 is fed into an input line 276 on an auxiliary board 275, shown in FIG. 10, and this signal on the line 276 sets a latch 278 and causes signals to be sent to a gate 280 to inhibit operation of the batch total count and to a gate 282 to inhibit operation of the grand total signal.

As hereinbefore mentioned, the latch 278 is set when a signal indicating that a piece of sheet material has been fed into the machine is received on the input line 276. Setting of the latch 278 sets the alarm circuit which is triggered by operation of any one of the microswitches 78, shown in FIG. 2. Should one of the wheels 46 of the machine having one of the microswitches 78 associated therewith be rotated in the direction opposite the through feed direction a signal is emitted by the closure of the microswitch, the signal being received on the line 284 of the auxiliary board 275, shown in FIG. 10, a switch 286 is included in the line 284, so that the alarm circuit can be rendered inoperative if desired. Normally, however, the switch 286 is closed thus rendering the alarm circuits active. When a signal is received on the line 284 to the latch 278, an alarm signal is emitted on a line 288 which operates an audible warning device to draw the operator's attention to the situation, and an alarm signal is emitted on the line 290. The line 290, shown in FIG. 10, is connected to an alarm input line 292 on the control board, shown in FIG. 9, leading to the alarm control 269. If an alarm signal has been given on the line 200 the alarm control prevents the passage of any signal from the line 246 to the output line 294 from the alarm control. Once the latch 278 has been set to the alarm condition by receipt of a signal from one of the microswitches 78, the latch remains in the alarm condition until a signal is received on the line 276 indicating that a new skin has been put into the machine. However, there is a slight delay on the signal going to the line 276 when a skin is fed into the illustrative machine and thus the latch 278 is not reset to the clear condition until after a signal indicating that a new skin has been put into the machine is delivered on the line 246; thus the alarm control is not reset to permit such a signal to pass from the line 246 to the line 294 in time to receive this signal; the insertion of the new skin therefore fails to activate the skin counter 270; in this way the passage of the skin in respect of which an alarm signal was given by one of the microswitches 78, is not recorded on the skin counter 270.

Assuming that the alarm control 269 is set in the condition in which passage of signals from the line 246 to the line 294 is permissible, when the trailing edge of a skin passes from between the last of the wheels between which and the glass roller the skin has been present, the signal given on the output lines 260,262 from the "or" gate 258, shown in FIG. 7, changes and thus the signal on the line 246 and on the line 294 changes. An output line 296 from the line 294, on FIG. 8a, is connected to a line 298, shown on FIG. 10, on the auxiliary board. The change of signal occurring when the trailing edge of a skin passes from between the last wheel and the roller causes a batch counter and comparator 300, shown in FIG. 10, to register a count, to increase the recorded batch total by one. It will thus be appreciated that the skin counter 270, shown in FIG. 8a, and thus the visible display of skin count are operated to increase the total when the leading edge of a skin first enters between one of the wheels and the glass roller but the batch counter and comparator 300, is operated to increase the batch total by one when the trailing edge of a skin leaves the machine. Assuming, now, that during the course of measurement of the area of a skin, a signal is received from one of the microswitches causing operation of the alarm control 269, at the beginning of that skin, the skin counter 270 will have increased the displayed skin total by one; however, as the alarm control 269 will have been set during the passage of the skin through the machine, when an end of skin signal is received on the line 246 this will not be transmitted to the line 296 and thus no signal will be received on the line 298, shown in FIG. 10, and the number of skins counted by the batch counter and comparator will not be increased. However, when the next skin is inserted into the machine the latch 278 will be reset (but too late to operate the skin counter); thus, for this new skin the skin counter 270 will remain at the count generated by the preceding skin. At the end of this next skin, however, because no alarm signal has been given on the line 292, the end of skin signal will reach the line 296 and will thus be counted by the batch counter and comparator 300 thus it is ensured that both the skin counter 270 and the batch counter and comparator 300 only count the number of skins which actually pass through the illustrative machine without an alarm signal being given by one of the microswitches 78. An alarm signal on the alarm input line 292 which operates the alarm control 269 also goes by a line 293, shown in FIG. 8a, to the line 250 which resets the area counter 138, the counters 212,216 and the extra pulse control 206, to zero; the LED displays 236, shown in FIG. 8b, are also set to zero and operation of the counters will not recommence until a new skin is fed into the machine. Thus if the alarm signal is given by operation of one of the microswitches the area of the piece of sheet material in respect of which the alarm signal was given is not recorded nor displayed on the display unit, nor is the passage of this piece of material through the machine recorded and in order to measure the area of that sheet of material the sheet has to be passed through the machine again.

The machine comprises a number of thumb-wheel switches 302, shown in FIG. 10, which may be set by an operator, prior to insertion of a piece of leather in the machine, to set the batch size to be counted by the machine, thus setting the circuits of the batch counter and comparator 300 to the desired level. When the batch counter and comparator 300 counts (by end of skin signals received on the line 298) that the number of skins fed through the machine, since the previous batch total is one less than the batch total set by the switches 302, an output signal is given on a line 304, through a line 306 to illuminate an indicator lamp 308, shown in FIG. 8b, thus signalling that the next skin to pass through the illustrative machine will be the one to complete the batch. When the counter and comparator 300 counts that the skin count, since the last batch total, has again reached the batch total set by the thumb-wheel switches 302, a batch total signal is given on an output line 310 from the comparator 300. This signal, after passing through a delay 312, shown in FIG. 10, passes through a gate 314 giving an output on a line 316 and on a line 318. The output on the line 318 signals a pulse generator 320 which in turn causes a signal to be sent on a line 322 to open the gate 282 and to a gate 324. A batch total signal on the line 316 is received by a line 326 on the control board, shown in FIG. 8a, this batch total signal resetting the skin counter 270 and associated visual display 272, shown in FIG. 8b, to zero. A batch total signal on the line 316 is also connected to an input 328, shown in FIG. 9, on the test board, for a purpose to be described hereinafter.

A circuit 330, shown in FIG. 10, for detecting when all the thumb-wheel switches are set at nought is arranged to cause a circuit 332 to render the batch total circuitry inoperative along with the test sequences to be described hereinafter by preventing batch total signals passing through the delay 312 to the gate 314 and preventing the operation of a driver 334 for the indicator lamp 308, shown in FIG. 8b. Alternatively a setting of the thumb-wheel 302 in a machine otherwise similar to the machine to nought may render the batch total circuits inoperative but cause a full test sequence to be operated every twenty or forty skins (depending on the circuitry selected).

The machine furthermore comprises a switch (not shown) operated by a push button (not shown) which sends a signal on a line 336 to the gate 280, shown in FIG. 10. Provided that the gate 280 is not prevented from passing a signal through by a signal on the line 276 indicating that a skin is in the machine, a signal leaves the gate 280 on a line 338 to the gate 314. Receipt of a signal generated by the push-button switch on the line 336 by the gate 314 causes a batch total signal to be given on the line 316 which, as hereinbefore described, resets the skin counter 270 to zero and is also supplied to the input 328 of a test board 339, shown in FIG. 9.

The machine also comprises a push-button operated switch (not shown) by which a signal may be given on a line 340 to the gate 282, shown in FIG. 10. When this push-button is depressed to generate a signal on the line 340, an output signal is given from the gate 282 on a line 342, this output signal travelling to a buffer board (not shown) on which the total area of skins measured since the previous operating of this grand total push-button occurred, is stored, the signal causing this total area to be printed out as a grand total on a printer (not shown) attached to the machine. The grand total push-button is effective to generate a grand total signal on the output line 342 from the gate 282 only when the gate 282 is not inhibited by a signal on the line 276 (when there is a skin passing through the machine) or a signal on a line 344 (indicating that the machine is undergoing test) and only when a signal is present on a line 346 indicating that a batch total sequence has just operated.

As hereinbefore mentioned the machine comprises test means by which the functioning of the machine in the correct manner may be checked. The machine comprises means arranged to emit a test start signal, operative only when there is no sheet material between the wheels 46 and the surface of the glass roller 14. The means arranged to emit a test start siganl may be manually operated, e.g. a manual test button or may be automatic, circuitry of the machine being arranged to emit the test start signal after the machine has carried out a particular sequence of operations. A selector switch 350, shown in FIG. 9, is provided which may be set by the operator in the position in which it is shown in FIG. 8 of the drawings, in which position the test start signal is emitted automatically as hereinafter described in the operation of the machine, or the switch 350 may be set in an off position (shown in dotted-line in FIG. 8 in which position no tests may be run. Finally the switch 350 may be set in a manual position (indicated in FIG. 8 by chain-dot lines) in which tests may be initiated by operation of the manual test button as hereinafter described.

The machine, as hereinbefore mentioned, comprises a switch arranged to switch the measurement unit from quarters of a square foot to square decimeters and vice versa. The output from the switch is received on a line 352, shown in FIG. 10, into the gate 324. If there is no leather in the machine, operation of the selector switch causes an output to be given from the gate 324 on a line 354, the output on the line 354 being received on the line 222, shown in FIG. 8a, and setting a detector 356 to the correct unit as well as operating the unit selector 220 as hereinbefore described. The line 354 is also connected to a line 358 on the scan board, shown in FIG. 7, by which a comparator 360 is also set to the correct units as selected by the unit selector switch. When the unit selector switch is changed from one unit to the other unit an output is also given from the gate 324 on the line 346 to the gate 282 to cause a grand total to be given of all the work which had passed through the machine since the previous grand total. Likewise an output signal is given from the gate 324 on the line 362 to the gate 280 to cause a signal to be sent on the line 338 thus to cause a batch total signal to be given on the line 316 from the gate 314 and cause a batch total to be printed of the batch accumulated since the previous batch total signal was given.

The gate 324 is, however, inhibited from giving any output signal on any of the lines 354,346,362 whilst a skin is in the machine passing between the wheels 46 and the roller 14. This is achieved by applying a signal from the output line 296, shown in FIG. 8a, from the control board, to an inhibit line 364 to the gate 324; shown in FIG. 10, the inhibit signal on the inhibit line 364 prevents any output on the lines 354,346,362 until the end of the skin has been reached at which time the signal on the line 296 will change and remove the inhibit signal from the line 364 thus allowing the gate to be operative and give the appropriate output signals on the lines 354,346,362. Should an alarm signal be given and the alarm control 269 prevent an output on the line 296, the gate 324 will be operative but this will not cause any problem in view of the cancellation of all registers by the alarm signal. Operation of the manual test button sends a signal on a line 366 to the gate 280 and to a gate 368. Should a skin be present in the machine when a signal is given by the test button, a signal indicating this will be present on the line 276 and will prevent operation of the gate 280. The signal to the gate 368 on the line 366 sets the gate 368 in correct condition. Assuming that there is no signal on the line 276 indicating skin present, the signal on the line 366 to the gate 280 causes an output on the line 338 causing a batch total signal to be given on the line 316 with the effect herein described and causes a signal to be given on a line 370 to the gate 368 to cause output signals to be given on lines 372,374 from the gate 368. The signal on the line 372 is received on a line 376 on the test board 339 shown in FIG. 9, leading to a test override circuit 378. The test override circuit gives a test set signal on an output line 380. The line 380 is connected to a line 382, shown in FIG. 7, on the scan board and the test set signal on the line 382 is conducted to a first test control 384 of first test means of the machine. The output line 380 is also connected to a line 386 on the test board leading to a second test control 388, shown in FIG. 9, of second test means of the machine. The line 380 is also connected to a line 390 on the scan board leading to a latch 392 of third test means. The line 380 is also connected to a line 500, shown on FIG. 8a, on the control board to a gate 502 to cause the counters 212,216,138 to be reset. Emission of a set test signal on the output line 380 to the lines 382, 386,390 causes the test controls 384,388 and the latch 392 to be set to the conditions in which the first, second and third test means are operable to carry out the tests governed thereby. Operation of the manual test button also causes a signal on a line 503 on the control board, to a gate 442 to illuminate the test lamp on the display.

The output from the gate 368 on the line 374 is in the form of a test pulse which is received by a pulse input line 394 to the manual setting of the switch 350 on the test board, shown in FIG. 9. The test button 348 is thus only effective to start a test sequence when the switch 350 is in the manual position. The test sequence when the switch 350 is in the manual position is the same as the test sequence when the switch 350 is in the automatic position in which it is shown in FIG. 9 and operation of the first, second, and third test means will be hereinafter described assuming that the switch 350 is in the automatic position as shown.

Operation of the first test means will now be described. As hereinbefore mentioned the first test control 384 of the first test means is situated on the scan board shown in FIG. 7; operation of the first test means causes a check on each of the first, lower, photoelectric cells 94 (electronically) and of the second photoelectric cells 92, both optically and electronically, through the circuitry of all of the input boards to the scan board, thus to check that the input circuitry to the scan board test control 384 is working satisfactorily. The first test means is set in operation by supply of a start signal on a line 396 on the scan board to the first test control 384. The signal is fed to the line 396 from a line 398 on the test board shown in FIG. 9. When the switch 350 is in the manual position (shown in chain-dot line in FIG. 9) the test start signal is supplied to the line 398 and thus to the line 396 and first test control 384, shown in FIG. 7, by operation of the test push button, shown in FIG. 10, to give a test start pulse on the input line 394 to the switch. However, in the automatic position of the switch 350 in which the switch is shown in FIG. 9, the test start signal is fed to the line 398 from a line 400 on the test board, as shown in FIG. 9. The test start signal is fed to the line 400 from a line 402 on the scan board leading from an output from the end of skin detector circuit 264.

When the signal on the output line 260 from the six-way "or" gate 258 indicates that the trailing end of a skin has just passed from between the wheels and the glass roller 14, the signals on the output lines from the end of skin detector circuit 264 are changed. One of the output lines from the detector circuit 264 is the line 274 which is connected to the line 276 on the auxiliary board, shown on FIG. 10. When a signal indicating the end of a skin is given on the line 274 the gates 280,282 cease to be inhibited thus permitting the passing of a batch total signal as hereinbefore described. A line 404, shown in FIG. 7, leads from the detector circuit 264 to the skin control circuit 266; when an end of skin signal is given by the detector circuit 264 on the line 404 the control circuit prevents the passing of an output signal from the control circuit 266 on the line 268; thus operation of the skin counter 270 is prevented during operation of the first test means in carrying out the first test. A line 406 (from which the line 402 leads) connects an output from the end of skin detector circuit 264 with the area control 182. An end of skin signal on the line 406 prevents passage of area pulses through the area control 182 to the line 184, thus preventing pulses from the wheels 46 being counted during operation of the first test. The signals on the line 404,406 are maintained during operation of the first test to prevent area pulses being passed by the area control 182 and to prevent a skin signal being passed from the line 262 to the line 268 by the control circuit 266. When the first test is satisfactory an output signal on a line 408, shown in FIG. 7, from the first test control 384 to the detector circuit 264 clears the detector circuit 264 thus removing the signals from the lines 404 and 406 so that passage of area pulses through the area control 182 is again possible and passage of a signal from the line 262 to the line 268 through the control circuit 266 is likewise possible.

As hereinbefore mentioned an end of skin signal on the line 402 provides the test start signal to the first test control of the first test means thus to start the first test (when the switch 350 is set in the automatic position). When the test start signal is received on the line 396 by the first test control 384 the output signal on the line 408 is also supplied on a branch line 410 to a timer circuit 412, shown in FIG. 7, thus causing an output signal to be given on a line 414 to the test control 384 which causes a signal to be given on an output line 416 from the test control. Considering, for convenience, only one wheel 46 and associated support member 58, this output signal on the line 416 is supplied to an input line 418 of the support member 58 of the illustrative machine shown in FIG. 6a (the output line 416 being connected to the input line of each of the support members 58 of the machine). The signal on the line 418 is supplied to a transistor 420 connected with the first, lower, photoelectric cell 94; when the signal is supplied on the line 418 to the transistor 420 the photoelectric cell 94 is forced to the condition which normally indicates the presence of a piece of sheet material in the machine and thus gives a read output signal on the output line 130 to the input line 132. The signal on the line 132 is transmitted to the end of skin detector circuit 264 on the line 260 but the detector circuit 264 (having previously detected and end of skin) is not in a condition to pass the signal through. Likewise the skin control 266 receives the signal from the line 132 on the line 262 but is prevented from passing the signal through to the line 268 by the signal on the line 404 as previously mentioned. Thus the skin counting circuitry of the machine does not respond to the signal which would normally indicate the presence of a skin, generated in the operation of the first test on the line 130.

The output line 416 is also connected to an input line 422 (one such input line being provided on each of the six input boards, see FIG. 6b. the signal on the line 422 goes to a second test control of the first test means and sends an output signal from the second test control 424 to the gate 174 and, on a line 426 to the latch 166 (and the latch of the other nine input circuits of that input board). The signal to the gate 174 sets the gate for receipt of a signal on a line 428 from a gate 430. The signal on the line 426 sets the latch 166 to a different state thus giving an output signal on the line 168 to a lamp driver 432 thereby illuminating a light emitting diode fault indicator (one of these fault indicators being provided for each input circuit of the input board). The latch 166 remains set in the test state to which it has been set by the signal on the line 426 until a pulse is received on the lines 134, 136 from the second photocell 92 associated with that input circuit. When a pulse is received on the line 136 a pulse is given on the output line 164 from the pulse shaper 160 when the next clock pulse is received on the input circuit clock line 158 (the pulse shaper 160 being in the read condition by virtue of the signal on the lines 132, 162 caused by the signal on the line 148). When an output pulse is received on the line 164 the latch 66, shown on FIG. 6b, is reset to its initial condition thereby removing the signal from the lamp driver 432, thus extinguishing the light emitting diode fault indicator 434. Reversion of the latch 166 to its initial state caused by the pulse on the line 164 causes a signal to be transmitted on an output line 436 from the latch 166 to the gate 430. An output line (of which the output line 436 is representative) is provided from each of the latches of the input circuits of the control board, that is there are ten such output lines going to the gate 430. When the signal indicating reversion of a latch to its initial condition is received on all of the ten output lines 436 by the gate 430 a level change signal is given on the line 428 to the gate 174 and is transmitted by the gate to the output line 176 to the six-way "or" gate 178 of the scan board. When such a level change signal is received by the gate 178 from all six of the input boards a level change signal is given on the output line 180 from the gate 178 thus indicating that the first test has been satisfactorily completed, the signal on the line 180 being fed by a line 438 to the first test control 384. Receipt of this level change signal by the first test control 384, shown in FIG. 7, causes a level change signal on the line 408 which resets the end of skin detector circuit 264 to a condition in which it will again permit transmission of a signal indicating a new skin in the machine received on the line 260. Resetting of the detector circuit 264 removes the signals from the lines 404,406 thereby resetting the area control 182 to a condition in which area pulses can pass through from the line 180 to the line 184 and resetting the skin control circuit 266 to a condition in which a signal on the line 262 indicating the introduction of a new skin to the machine is passed to the line 268.

When the test start signal is received on the line 396 by the first test control 384 a signal is also given on an output line 440 to the gate 442, receipt of the signal by the gate 442 causes an output signal to be given on a line 444, the line 444 being connected to a line 446 leading to a lamp driver 448 which illuminates a test/fault indicator lamp 450 on the display. This indicator lamp 450 remains illuminated until all tests being run by the machine have proved satisfactory. Thus, when the first test only is being run, when the test satisfactory level change signal is given on the line 438, the first test control 384 removes the signal from the line 440 and the gate removes the signal by which the indicator lamp 450 is illuminated, thereby extinguishing the lamp 450.

The timer circuit 412, shown on FIG. 7, is arranged to give the test signal on the line 414 and thus on the line 416 for a predetermined period (70 milliseconds in the machine) sufficient that at the possible throughput speed or speeds (i.e. the speed of rotation of the glass roller 14) of the machine every wheel 46 of the machine will, if the machine is operating correctly, have rotated through sufficient distance to cause at least one pulse to be emitted by the photoelectric cell 92 of each wheel on the output line 134. Thus, if the wheels and the circuitry are operating correctly all of the latches of every input circuit of all the six input boards will be caused to revert to their initial conditions so that, as hereinbefore described, level change signals will be received by the gate 178 from all of the input boards. However, should a pulse fail to be given by one of the photoelectric cells 92, for example because the wheel associated with that cell is sticking or because that photoelectric cell is not functioning correctly, the latch 166 is associated with that photoelectric cell will not receive a pulse to cause it to revert to its initial state and will remain in its test state maintaining the fault indicator light 434 of the appropriate input circuit illuminated. Furthermore, a level change signal will fail to be given on the line from the input board in connection with which the fault has occurred, to the gate 178 and thus no test correct level change signal will be received on the line 438 and the first test control will therefore maintain the first test means in a test condition. In particular the signal will remain on the line 440 maintaining the lamp 450 illuminated, and no reset signal will be given on the line 408 so that the end of skin detector circuit will remain in the condition in which it prevents passage of signals through the area control 182 and the control circuit 266. The timer circuit 412 is arranged so that if no level change signal is given on the line 408 (indicating that a test satisfactory signal has been received on the line 438 by the first test control 384) the 70 millisecond test signal is given on the line 414 after elapse of a second and the first test is thus run through again in the same manner as hereinbefore described. This recycling of the first test continues until the gate 178 receives signals from all six input boards indicating that the operation of the first test is satisfactory.

Sometimes the first test may fail on its first cycle merely because a piece of dust has obscured one of the photoelectric cells 92 momentarily during the test or because one of the wheels 46 is caused to stick momentarily by a piece of dirt during the test. Should such transitory faults cause initial failure of the first test, the first test will be completed satisfactorily at the second attempt (under the control of the timer circuit 412) and the further operation of the machine will not be impeded. However, in the event that a persistent fault has occurred, the first test will continue to recycle as hereinbefore described until action is taken by the operator to correct the fault. The faults indicator 434, shown in FIG. 6b, of the input circuit in which the fault is occurring will remain illuminated so that the area of the fault can readily be located and corrected. As hereinbefore mentioned, when the fault has been corrected, the lamp 450, shown in FIG. 8b, will be extinguished and the machine can again be used to measure area. However, whilst the first test means indicates that the machine is in a faulty condition it is impossible for the machine to be used to measure the area of any sheet material.

Second test means of the machine is now described. A test start signal may be given, as hereinbefore mentioned, by operation of the test button (when the switch 350 is in its manual position), the test start signal being received on the input line 394 to a start line 452. When, however, the machine is operating with the switch 350 set, as shown in FIG. 9, in the automatic position, a test start signal for the second test means is transmitted to the start line 452 via the input 328 on the test board, as shown on FIG. 9. The test start signal is given to the input 328 from the line 316. Such a test start signal is placed on the line 316 when, as hereinbefore described, a batch total signal is generated either by operation of the batch total button to cause a signal on the line 336 thereby to generate a test start signal on the line 316, or by a batch total signal generated by the counter and comparator 300, likewise to cause a test start signal on the line 316.

When a test start signal is received on the line 452 it is fed to the second test control 388 (of the second test means) to start second and third test sequences of the machine. As will be recalled, a batch total signal is only given when no skin is passing through the machine. Thus, when the switch 350 is in the automatic position, a batch total signal will be given when the end of skin signal is emitted in respect of the final skin making up the batch. As previously described, the emission of an end of skin signal initiates a test start signal for the first test means. Thus, when the switch 350 is set in the automatic position, the first test means and the second test means are caused to run through the first, second, and third test sequences at the same time. The batch total signal will also be given to the line 452 when the switch is set in the automatic position when the machine is first switched on and, when switch 350 is in either the manual position or the automatic position, when the switch to change the units of measurement between the quarters of the square feet and square decimeters and vice versa is operated. Receipt of a test start signal on the line 452 by the second test control 388 sets the control 388 for receipt of signal from a proximity switch (not shown) associated with the glass roller 14, on a switch line 454. The glass roller 14 has a metal block secured to the roller at one end portion thereof. The metal block (not shown) has a curved outer surface secured to an inner surface of the glass roller so that the block rotates as the roller rotates. The metal block extends partially round the periphery of the roller and has a radial leading face and a radial trailing face. The peripheral distance between the leading and trailing faces of the metal block is determined by the dimensions of the roller as hereinafter described.

As hereinbefore mentioned a proximity switch (not shown) is associated with the roller 14; this proximity switch is situated adjacent the path of travel of the metal block as the roller rotates. So that as the roller rotates the leading and trailing faces of the metal block will operate the proximity switch sending signals on the line 454 to the second test control 388. The second test control is so constructed and arranged that, when a test start signal has been received on the line 452, receipt of a signal on the proximity switch indicating first the leading face of the metal block and a further signal indicating the trailing face of the metal block causes an output signal to be given from the second test control 388 on a line 456 to operate a switch (not shown) and thereby switch off the lower light tube 26. Switching off of the lower light tube 26 stops light falling on the lower photoelectric cells 94 and thus causes an output signal to be given on the output line 130 from each of the lower photoelectric cells 94 thus causing a signal to be given on the lines 260,262, as shown in FIG. 7, thus giving signals on the lines 274,268 which would normally indicate the presence of a skin in the illustrative machine. Thus, area pulses generated by rotation of the wheels pass through the area control 182 on the line 184 to the gate 186. The area output pulses from the gate 186 appear on a line 458 as well as the output line 188. The line 458 is connected to a third test input line 460 on the test board.

The area signal output line from each of the six input boards, as well as being connected to the gate 178, is connected to an input line on the test board, shown in FIG. 9; the area signal output line 176 of the test board shown in FIG. 6b is connected to an input line 462 for the second test sequence of the second test means. Each of these input lines leads to a counter and comparator, each of the counters and comparators having an output to an "and" gate 464; the input line 462 is connected to a counter and comparator 466 which in turn is connected by a line 468 to the "and" gate 464. The third test input line 460 of the second test means leads to a counter and comparator 470 of the second test means.

After the lower light tube 26 has been extinguished by the signal on the line 456 emitted as a result of the signal on the switch line 454 as hereinbefore described, it is necessary to allow a slight elapse of time before initiating the test counts which form part of the second and third test sequences of the machine. This elapse of time is necessary to allow the filament of the tube 26 to cool so that it emits insufficient radiation to activate any of the photoelectric cells 94; a period of one hundred milliseconds is sufficient for the light tube 26 used in the machine to reach this stage. The second test control 388 is therefore so constructed and arranged as to initiate the test count of the second test means on receipt of a second start signal on the line 454 from the proximity switch; this start signal will be emitted by the proximity switch when it detects the leading face of the metal block next following the signals from the switch which cause the light tube 26 to be switched off by the signal on the line 456. When this start test count signal is received on the line 454 by the second test control 388, a start signal is emitted from the test control 388 on a line 472, the line 472 being connected to the counter and comparator 470 causing the counter and comparator 470 to count the pulses received on the line 460 from the line 475 of the scan board, and to the counters and comparators 466, causing them to start counting the signals received on their input lines 462 from the output lines 176 of the input boards. The glass roller 14 rotates and the wheels 46 run on the surface of the glass roller emitting area pulses on the line 176 which, as previously mentioned are finally received on the lines 460,462 and fed to the counters and comparators 466,470. As the roller rotates signals will continue to be received on the line 454 from the proximity switch as the trailing face and leading face of the metal block pass the proximity switch. The second test control 388 is arranged to count the signals received on the line 454, shown in FIG. 9, until the signals indicate that the glass roller has revolved slightly over three times since the count start signal was emitted on line 472; the test control 388 removes the count signal from the line 472 when it receives from the line 454 the signal denoting the trailing edge of the metal block received when the glass roller has rotated just over three revolutions. The distance between the leading face and trailing face of the metal block is selected so that, in rotating three revolutions plus the small distance travelled from the leading edge of the metal block to the count stop signal at the trailing edge of the metal block after the completion of the third revolution, the surface of the glass roller 14 on which the wheels 46 run has travelled through a preselected distance. Because in the manufacture of the glass tubes, slight variations in diameter occur, tubes which are nominally of the same diameter may differ slightly from the nominal diameter. Thus, the diameter of each glass roller is measured before the roller is incorporated in the machine and a metal block secured to the roller as hereinbefore described having such distance between its leading face and trailing face as to compensate for any departure from the nominal diameter. Thus, as the machine is set initially to carry out the second and third test sequences by counting the number of signals emitted as the running surface of the glass roller moves through preselected distance, should the glass roller of the machine be broken, it can be replaced by another roller without making any machine adjustments—the replacement roller having been measured and calibrated by securing to it a metal block of the correct dimensions in the manufacturer's factory. The glass roller is nominally about 155 mm in diameter. The leading and trailing faces of the metal block are spaced apart such that in rotating three and a bit times as hereinbefore described the surface of the roller travels through 1470 mm. This should result in every wheel running on the roller (provided the machine is operating correctly) rotating so that the running surface of the wheel also moves through 1470 mm. As the running surface of each wheel is split, in effect, into 20 mm lengths this means that each wheel should, theoretically, produce about 73 pulses for this rotation but depending on the position of each wheel when the start counting signal is given on the line 472 and the position of the wheel when the stop counting signal is given, the actual number of pulses emitted by each wheel during the test may differ from the theoretical number significantly. Statistically, it can be calculated that for a group of ten wheels, a difference in number of pulses received from the theoretical number of up to 4% is within acceptable accuracy bounds. Each of the comparators 466 is therefore programmed to compare the number of area pulses received on the line 462 with this predetermined acceptable range. In the case of the present machine, the acceptable range is between 704 and 767 pulses for each group of ten wheels. Should the number of pulses arriving on the line 462 whilst the count signal is on the line 472 be outside this acceptable range of 704 to 767, a fault lamp 474 which is illuminated when the count start signal is given on the line 472, shown in FIG. 9, remains illuminated and no output is given on the line 468 to the gate 464, thereby indicating that the signals received on the line 462 from the input board to which the line 462 is connected were outside the acceptable tolerance range.

Should the number of pulses received on the line 462 be within the acceptable range, however, the comparator 466 extinguishes the warning light 474 and gives an output signal on the line 468. Should signals be given on all of the lines 468 leading to the comparator 464, thereby indicating that the number of signals received by all of the counters and comparators 466 were within the acceptable range an output signal is given on a line 476 to an "and" gate 478, shown in FIG. 9.

Similary the counter and comparator 470 receives all of the signals generated by a group consisting of all 60 of the wheels 46 whilst the count signal is applied by the second test control 388 to the line 472 and compares them with an acceptable range of numbers of pulses stored in the counter and comparator 470. Because the comparator 470 is receiving signals from 60 wheels, a statistically acceptable tolerance is plus or minus 2% of the theoretical number of pulses (whereas the statistically acceptable tolerance for groups of ten wheels is plus or minus 4% of the theoretical number of signals). When the count signal is first applied to the line 472 to start the counter and comparator 470 a fault lamp 480 is illuminated. Should the number of pulses received on the line 460 by the comparator 470 be within the acceptable range of pulses (these pulses providing test signals) an output is given from the comparator 470 extinguishing the fault lamp 480 and an output is given from the comparator 470 on a line 482 to the gate 478. Receipt of signals on the lines 476,482 indicating that the number of pulses emitted by the signalling means of each group of 10 wheels and by the group of wheels consisting of all the wheels of the present machine, are within the acceptable range and thus that each group of 10 wheels is functioning within the predetermined tolerances for groups of 10 wheels and that the group of wheels consisting of all the wheels is functioning within the predetermined tolerance for the machine, a test satisfactory signal is emitted from the gate 478 on a line 484 to the second test control 388. When a test satisfactory signal is received on the line 484, the signal on the line 456 is changed to switch the light tubes 26 back on and the signal on the line 484 is transmitted on a line 486 to a line 488 on the scan board, the line 488 leading to the gate 442. However, should a test satisfactory fail to be received on either of the lines 476,482, no output signal is given on the line 484 and thus no signal is given on the line 488 to the gate nor is a signal given reilluminating the light 456. In the event that no test satisfactory signal is given on the line 484, the second test control 388 allows the second and third test sequences of the second test means to run through again. This recycling of the second and third test sequences will continue until a test satisfactory signal is emitted from the gate 478 on the line 484.

When the second test means is set in operation by the test start signal, the test/fault lamp 450 on the display board is illuminated via the gate 442; this lamp will remain illuminated until a test satisfactory signal is received on the line 488 via the gate 442.

The fault lamp 474,480 associated with the group of wheels in respect of which the fault is arising preventing the emission of the test satisfactory signal by the second test means remains illuminated until the fault is rectified, thus facilitating the tracing of the fault.

The present machine further comprises third test means by which the operation of the counter 138 and counters 212,216 is checked. A start signal for the third test means is emitted on a line 488 leading from the line 452, a signal being received on the line 452 from the line 328 or the line 394 depending on the setting of the switch 350. Thus the third test means is set in operation to run a fourth test sequence of the machine at the same time as the second test means is set in operation.

The line 490 is connected to a line 492 on the scan board (see FIG. 6), the line 492 leading to the latch 392 of the third test means. Receipt of the test start signal on the line 492 by the latch 392 sets the latch 392 to a test condition in which a signal is given on an output line 494 from the latch 392. The signal on the line 494 opens a gate 496 into which clock pulses are fed on a line 498 from the clock 140. The line 494 is also connected to a line 500 on the control board, shown in FIG. 8b, the line 500 being connected to an "or" gate 502. The signal on the line 500 from the line 494 causes the gate 502 to emit an output signal on a line 504 which resets the counters 212,216,138, and the extra pulse control 206. The line 500 is also connected to the line 380 on the test board so that when a test signal is given on the line 380 a signal is likewise given to the gate 502 to reset the counters 212,216,138 and control 206 to zero as hereinbefore mentioned. Finally, the signal on the line 494 is fed to the gate 186; the gate 186 is connected to the gate 496 by a line 506. When the signal on the line 494 has opened, the gate 496, clock pulses from the line 498 are fed through the gate 496 to the line 506 and through the gate 186 to the output line 188 from the gate 186. Thus receipt of the test signal on the line 492 of the third test means causes clock pulses to be fed on the line 188 to the area input line 190 on the control board.

Receipt of the clock pulses from the line 188 by the line 190 causes the counters 212,216 to count the clock pulses in the same way as the area pulses are counted. Depending on the setting of the units switch, pulses are fed from the appropriate one of the counters 212,216, through the unit selector 220 to the counter 138 and counted on the counter, the false area represented by the pulses being displayed on the visual displays 236. The pulses counted by the counter 138 are also supplied to the detector 356 which is set in appropriate condition to receive output signals from the counter 138 in the units to which the unit selector switch is set, by the signal on the line 222 from the line 354 by which the unit selector 220 is operated. The detector 356 is so constructed and arranged as to allow the counter 138 to operate until a predetermined area reading is reached; in the case of the present machine the predetermined area reading is 2222.2 (where the units are square decimeters) and 0222 and 2 quarters (where the units are quarters of a square foot). When the detector 356 detects that the counter has reached the aforementioned predetermined test count, a stop signal is emitted from the detector 356, shown in FIG. 8a, on a line 308 which is connected to a line 510 on the scan board.

When the signal from the latch 392 is given, as a result of the test start signal on the line 492 of the third test means, clock pulses from the line 498 are fed through the gate 496 to an output line 510 (as well as to the line 506). The clock pulses on the line 510 are fed to a counter 512 and counted. The pulses counted by the counter 512 are supplied to the comparator 360 which compares the pulses counted by the counter 512 with a preset number, the actual number being determined by the units in which the present machine is set to measure, the comparator 360, as shown in FIG. 7, being set to the appropriate condition for those units by a signal from the line 354, shown in FIG. 10, on the line 358.

When the stop signal is applied to the line 510 it is also transmitted on a line 514 to a gate 516. Receipt of the stop signal on the line 514 by the gate 516 causes a test satisfactory signal to be given on a line 518 if the signal on a line 520 from the comparator 360 to the gate 516 indicates that the number of pulses counted by the counter 512 is within a predetermined tolerance of the number of pulses which should have been necessary to cause the counter 138 to reach the false area total which the detector 356 is set to detect (in the present machine the number of pulses necessary to reach the figure set in the detector 356 is about 40,000 and the tolerance allowed is plus or minus 5 pulses). If, when the stop signal is received by the gate 516, the signal on the line 520 indicates that the number of pulses counted is within the aforementioned tolerance, the output signal on the line 518 indicating that test four sequence of the illustrative machine is satisfactory is transmitted on a line 522 to the gate 442 thereby indicating that test four sequence is satisfactory. The signal is also fed to a sequencer 524, for a purpose to be described hereinafter.

Should the output on the line 520 from the comparator 360 when the stop signal is received on the line 514 by the gate 516 indicate that the number of pulses counted by the counter 512 is outside the predetermined tolerance no test satisfactory signal is given on the line 518, shown in FIG. 7, but a recycle test signal is given on an output line 526 from the gate 516 to the latch 392 of the third test means thus giving an output signal on the line 494 similar to the signal given on that line when the test start signal is received on the line 492. The signal on the line 494 resets the counter 512 to zero, the signal being transmitted to the counter 512 on a line 528, opens the gate 496 so that clock signals are again allowed to pass from the line 498 to the line 506 and resets the counters 212,216,138 to zero by passage of the signal along the line 500. Thus the fourth test sequence, as carried out by the third test means, continues to recycle until a signal is given on the line 520, at the same time as a stop signal is received on the line 514, indicating that the number of pulses counted by the counter 512 is within the predetermined tolerances.

When the signals are received on the lines 440,488,522 indicating that the four test sequences under the control of the first, second and third test means are all satisfactory, an output signal is given on the line 444 to extinguish the lamp 450 on the display thereby indicating that the test sequence is finished and that the machine is satisfactory. This lamp 450 will not be extinguished if any one of the tests indicates that there is a fault in the machine, until the fault has been rectified. Whilst the machine is in a faulty condition, the electronic circuitry will not permit the machine to be used to measure area.

The third test means, as well as controlling the fourth test as hereinbefore described also provides a test for the printer circuits. Thus when the test satisfactory signal is given on the line 518 to the sequencer 524 a signal is transmitted on a line 530 from the sequencer 524 to the control circuit 266, this signal causing a signal to be given on the line 268 indicating the end of a skin. Receipt of this false end of skin signal sends a print command causing the printer to print the number shown by the display 236, that is the number at which the stop signal was given on the line 510 by the detector 356. At the same time as the false end of skin signal is given on the line 530 a test four batch total signal is given on a line 532, by the sequencer 524, this signal being received from the line 532 on a line 534 on the auxiliary board, shown on FIG. 10, to the pulse generator 320. When the false end of skin signal starts the printer, a printer busy signal is given on a line 536 to the pulse generator 320 and this causes an output signal to be given on the line 322 to reset the sequencer 524 causing a genuine batch total signal to be given to the printer to cause it to print the genuine batch total. Should the printer fail to print the correct output on the test four batch total, this can be seen by the operator who is then in a position to suspect that the genuine batch total of the batch which triggered the operation of test four, subsequently printed by the printer, may be incorrect, due to a faulty operation of the printer or printer circuit.

When an output signal is given from the gate 442 indicating that tests are satisfactory, a latch 538 from which the line 444 leads is caused to give an output signal also on a line 540. The line 540 is connected to a line 542 on the control board (FIG. 8) which in turn leads to a switch 544; the signal on the lines 540,542 causes the switch 544 to give an output signal on a line 546 which is connected to a latch line 548 on the display board, the signal on the line 548 resetting the memory decoders 234 of the display to zero.

The present machine also comprises a skin alarm timer 550 on the scan board, shown in FIG. 7. When a signal is received on the line 274 from the end of skin detector circuit 264, indicating that a piece of sheet material has been fed into the machine, the signal on the line 274 is fed to the skin alarm timer 550. The signal sets the timer in operation and the timer is set to emit a signal on an output line 552 leading to the gate 442. Should a preset time from the introduction of a skin elapse without an end of skin signal being given on the line 274 (the end of skin signal stopping the timer 550 and resetting it to zero), an alarm signal is given on the line 552 to the gate 442 causing the fault signal to be given on the line 444 which illuminates the indicator lamp 450 thereby indicating to the operator that a fault has arisen. The timer 550 of the present machine is set to emit the alarm signal 40 seconds after a skin has been introduced into the machine—a period of 40 seconds is sufficient for even the largest of hides to be fed through the machine at the slowest through feed speed of the machine.

The electrical circuits of the machine also comprise means (not shown) by which, if the test board, shown in FIG. 9, is removed from the machine, the machine will be closed down. Likewise, if one of the input boards is not present in the machine, the machine will likewise be closed down.

The machine is so constructed and arranged that operation of the test push button for carrying out any of the tests automatically, will not affect the memory associated with the grand total (this memory will only print out and be reset to zero on operation of the grand total push button or when units are changed, at the permissible times of the machine cycle) but will print a batch total on the printer and reset the batch total memory to zero.

When the machine has a plug in the foot switch socket on the line 238, the counter 138, shown in FIG. 8a, will continue to add the areas of each successive sheet of material fed through the machine until such time as the foot switch is operated which will clear the counters 212,216,138, resetting them to zero. Even when the machine is operated in the manual condition the number of articles passed through the illustrative machine is registered by the batch counter, shown in FIG. 9, and the indicator lamp 308, shown in FIG. 8b, will be illuminated when the last skin of the batch (as set by the thumb wheel switches 302) is passing through the illustrative machine.

To summarize the tests, the first test means provides a check of the input circuitry as far as the scan board; the second test means tests that each sub group of wheels (10 in the present machine) is functioning within the prescribed tolerances for a sub group of that size and tests that the group consisting of all of the wheels of the machine (60 in the case of the present invention is functioning within the prescribed tolerance for a group of that size; the third test means checks that the counter circuits are operating correctly and also provides a visual check for the operator to determine whether or not the printer unit and associated memories are operating satisfactorily; finally an alarm is provided which indicates when no end of skin signal has been received for a long period.

The test means and alarm of the machine give warnings and prevent use of the machine should any faults arise. In this way the machine provides more consistently accurate results than hitherto known area measuring machines because any fault which develops is quickly brought to light for rectification. Furthermore, the provision of warning lamps referred to earlier in this description facilitates tracing of any fault which develops thus allowing it to be put right more quickly. Furthermore, the machine of the present invention does not require any recalibration once it has left the factory; the ability of the machine to measure area to within the predetermined accuracy is determined by the construction of the machine, in particular by the spacing apart of the notches and of adjacent wheels to produce a suitable area matrix. Once this matrix has been determined by the manufacturer of the machine, the electronic circuitry requires no calibration to ensure that area is recorded.

We claim:

1. A machine for measuring the area of sheet material, said machine comprising:
    conveyor means comprising a conveyor surface for supporting sheet material the area of which is to be measured and for conveying the sheet material through said machine in the operation thereof;
    a plurality of wheels disposed side by side across said machine and arranged to run on sheet material conveyed by said conveyor means or, in the absence of sheet material, on said conveyor surface;
    detecting means, one associated with each wheel for detecting the presence of a piece of sheet material between each wheel and said conveyor surface;
    signalling means for signalling each time the periphery of a wheel has been rotated through a unit distance and for emitting a signal to be summed should the output from said detecting means associated with that wheel indicate that a piece of sheet material is present between the wheel and the conveyor surface;
    computing means for summing the signals from each wheel to indicate the area of the piece of sheet material;
    means arranged to emit a test start signal; and
    test means so constructed and arranged that upon receipt of the test start signal, test signals are fed to said computing means of said machine until said computing means registers a predetermined number, whereupon a stop signal is emitted, said test means comprising a duplicate summing means to which the test signals are also fed until the stop signal is emitted, said test means further comprising a comparator by which the number of signals recorded by said duplicate summing means is compared with the predetermined number, said test means being so constructed and arranged as to indicate a fault should the number registered by said duplicate summing means differ by more than a predetermined tolerance from the predetermined number.

2. A machine for measuring the area of sheet material as recited in claim 1, wherein said conveyor means comprises a roller, having a surface which provides the conveyor surface of said conveyor means.

3. A machine for measuring the area of sheet material as recited in claim 1, wherein said detecting means comprises:
    a first detector equally spaced from next-adjacent first detectors and arranged at one side of the path of travel of the sheet material through said machine, to detect a beam of radiation directed theretowards from a first radiation source arranged at the other side of the path of sheet material so that the presence of sheet material between said wheel and said conveyor surface breaks the beam of radiation;
    each first detector is a photoelectric cell and each first radiation source is a source of light;
    a single radiation source is arranged to direct a beam of radiation at all of the first detectors;
    each first radiation source is rich in infra red radiation and, where a single first radiation source is used to direct a beam of radiation at all of the first detectors, the first radiation source is a light tube.

4. A machine for measuring the area of sheet material as recited in claim 1, wherein said conveyor means comprises a roller which is transparent to the radiation, said roller being comprised of a glass tube having a source of light mounted therein to direct a beam of radiation at the first detectors.

5. A machine for measuring the area of sheet material as recited in claim 1, wherein each of said wheels comprises a rim portion projecting generally parallel with the axis of rotation of the wheel from the remainder of the wheel, said first detectors are first photoelectric cells, and each first detector is mounted on means by which the wheel is supported within the radius of the rim portion and the rim portion is continuous and transparent to infra red radiation emitted by the first radiation source, said first photoelectric cells being operated by the infra red radiation.

6. A machine for measuring the area of sheet material as recited in claim 1, wherein said signalling means comprises a plurality of second radiation detectors, one associated with each wheel, mounted on means for supporting the wheel within the radius of the rim portion at one side of the rim portion, and a second radiation source mounted at the opposite side of the rim portion to direct a beam of radiation towards said second detectors;

said wheel comprising alternate first and second portions, comprising a notched insert ring fitted in the rim portion and arranged so that as the wheel rotates the notched insert ring also rotates and intersects the beam of radiation from the second source;

the material of said insert ring being opaque to the radiation emitted by said second radiation source, said second radiation source emitting light rich in infra red radiation, so that when one of the notches in the notched ring intersects the beam, radiation from said second source reaches said second detector but when said ring itself intersects the beam, radiation from said second source is prevented from reaching said second detector.

7. A machine for measuring the area of sheet material as recited in claim 6, wherein said notches are so spaced apart that as said wheel rotates the distance moved by the running surface of said rim portion of said wheel from the point at which one of the notches intersects the beam of radiation from said second source permitting it to reach said second detector associated with said wheel, said notch being aligned between the second source of radiation and the second detector, to the point at which the next-adjacent notch in said notched ring intersects the second beam of radiation and again permits the second beam to reach said second detector, is a unit distance.

8. A machine for measuring the area of sheet material as recited in claim 7, wherein rotation of the wheel thus causes a pulse representing a unit area to be generated by said signalling means each time the rim portion of said wheel has rotated through the unit distance, the pulse being emitted by said signalling means to be summed by said computing means for summing the signals when said first detector associated with that wheel indicates the presence of sheet material between the wheel and the conveying means.

9. A machine for measuring the area of sheet material as recited in claim 7, wherein said test means comprises:
an indicator, comprised of a lamp which will be illuminated should a fault occur;
a visual display for displaying the area of a piece of sheet material which has been measured.

10. A machine for measuring the area of sheet material as recited in claim 9 which also comprises a printer on which the area of each piece of sheet material is printed after it has been measured.

* * * * *